(12) United States Patent
Joshi et al.

(10) Patent No.: US 7,043,494 B1
(45) Date of Patent: May 9, 2006

(54) FAST, DETERMINISTIC EXACT MATCH LOOK-UPS IN LARGE TABLES

(75) Inventors: Deepali Joshi, Pune (IN); Ajit Shelat, Pune (IN); Amit Phansalkar, Maharashtra (IN); Sundar Iyer, Palo Alto, CA (US); Ramana Kompella, Mountain View, CA (US); George Varghese, San Diego, CA (US)

(73) Assignee: PMC-Sierra, Inc., Santa Clara, CA (US)

( * ) Notice: Subject to any disclaimer, the term of this patent is extended or adjusted under 35 U.S.C. 154(b) by 398 days.

(21) Appl. No.: 10/353,723

(22) Filed: Jan. 28, 2003

(51) Int. Cl.
*G06F 17/30* (2006.01)
(52) U.S. Cl. .................... 707/101; 707/10; 707/102; 707/103 R; 707/104.1
(58) Field of Classification Search ................ 707/10, 707/100, 101, 102, 103 R, 104.1; 706/60; 710/200; 711/6, 133; 370/389
See application file for complete search history.

(56) References Cited

U.S. PATENT DOCUMENTS

| | | | |
|---|---|---|---|
| 4,866,634 A * | 9/1989 | Reboh et al. .................. 706/60 |
| 5,089,952 A * | 2/1992 | Bozman ..................... 710/200 |
| 5,404,488 A * | 4/1995 | Kerrigan et al. ............ 711/133 |
| 6,034,958 A | 3/2000 | Wicklund |
| 6,097,725 A | 8/2000 | Glaise et al. |
| 6,226,710 B1 | 5/2001 | Melchior |
| 6,597,661 B1 * | 7/2003 | Bonn ........................ 370/235 |
| 6,598,051 B1 * | 7/2003 | Wiener et al. .............. 707/100 |
| 6,690,667 B1 * | 2/2004 | Warren ....................... 370/389 |
| 6,701,317 B1 * | 3/2004 | Wiener et al. ................ 707/10 |
| 6,754,662 B1 * | 6/2004 | Li .............................. 707/101 |
| 6,789,156 B1 * | 9/2004 | Waldspurger ................. 711/6 |

OTHER PUBLICATIONS

Mishra, Priti et al., "Join Processing in Relational Databases", ACM Computing Surveys, vol. 24, No. 1, Mar. 1992.*
M V Ramakrishna, E. Fu, E. Bahcekapili "Efficient Hardware Hashing Functions for High Performance Computers", IEEE Transaction on Computers, Dec. 1997 vol. 46 No. 12, pp. 1378-1381.
J. Carter and M. Wegman, "Universal Classes of Hash Functions," Journal of Computer and System Sciences, vol. 18, No. 2, pp. 143-154, 1979.
Mukesh Singhal et al "A Novel Cache Architecture to support Layer four Packet Classification at Memory Access Speeds", IEEE Infocom 2000, pp. 1445-1454.
TC59LM814/06CFT-50, Toshiba 200MHz FCRAM datasheet, Nov. 30, 2001.
D. E. Knuth, The Art of Computer Programming, vol. 3, Sorting and Searching, §6.3 "Digital Searching" Addison Wesley, 1973, pp. 481-491.

* cited by examiner

*Primary Examiner*—Shahid Al Alam
(74) *Attorney, Agent, or Firm*—Townsend and Townsend and Crew LLP

(57) ABSTRACT

A combined hash table/bucket trie technique facilitates fast, deterministic, memory-efficient exact match look-ups on extremely large tables. A limited number of hash keys which collide on the same location can be stored in the hash table. If further keys collide on the same location, a bucket trie is formed, the colliding keys are stored in the trie, and trie traversal information is stored in the hash table. Regardless of the number of buckets in the trie, an input key need only be compared with the keys in one bucket to detect a stored key identical to the input key or conclude that no stored key is identical to the input key.

17 Claims, 17 Drawing Sheets

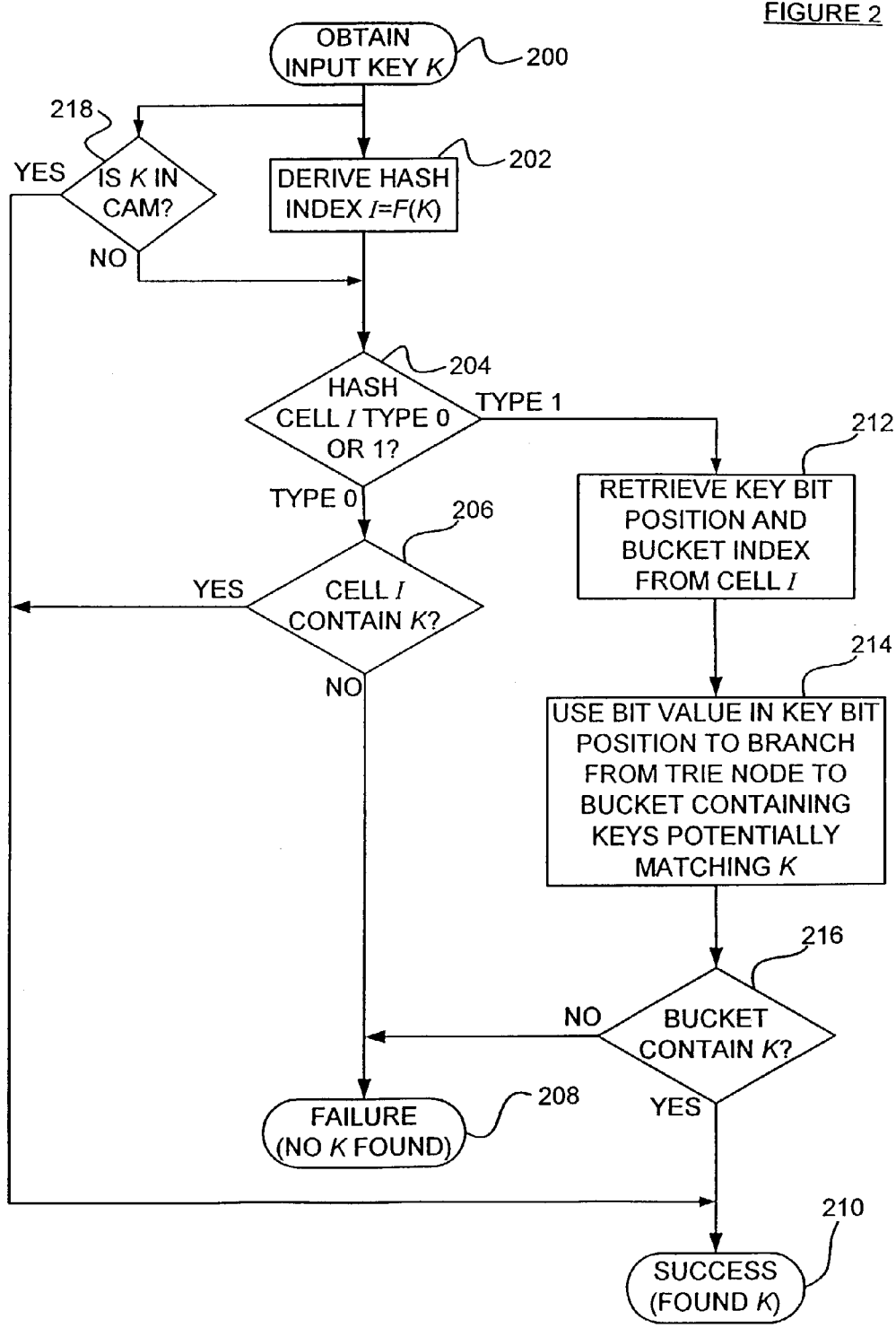

| TYPE | HK1 | I1 | HK2 | I2 |
|---|---|---|---|---|
| [255:254] | [253:150] | [149:127] | [126:23] | [22:0] |

FIGURE 5

| TYPE | UNUSED | BSEL0 | BSEL1 | BSEL2 | BSEL3 | BSEL4 | BSEL5 | BSEL6 |
|---|---|---|---|---|---|---|---|---|
| [255:254] | [253:232] | [231:224] | [223:216] | [215:208] | [207:200] | [199:192] | [191:184] | [183:176] |
| BID0 | BID1 | BID2 | BID3 | BID4 | BID5 | BID6 | BID7 | |
| [175:154] | [153:132] | [131:110] | [109:88] | [87:66] | [65:44] | [43:22] | [21:0] | |

FIGURE 6

| UNUSED | BK1 | BI1 | BK2 | BI2 |
|---|---|---|---|---|
| [511:510] | [509:406] | [405:383] | [382:279] | [278:256] |
| UNUSED | BK3 | BI3 | BK4 | BI4 |
| [255:254] | [253:150] | [149:127] | [126:23] | [22:0] |

FIGURE 7

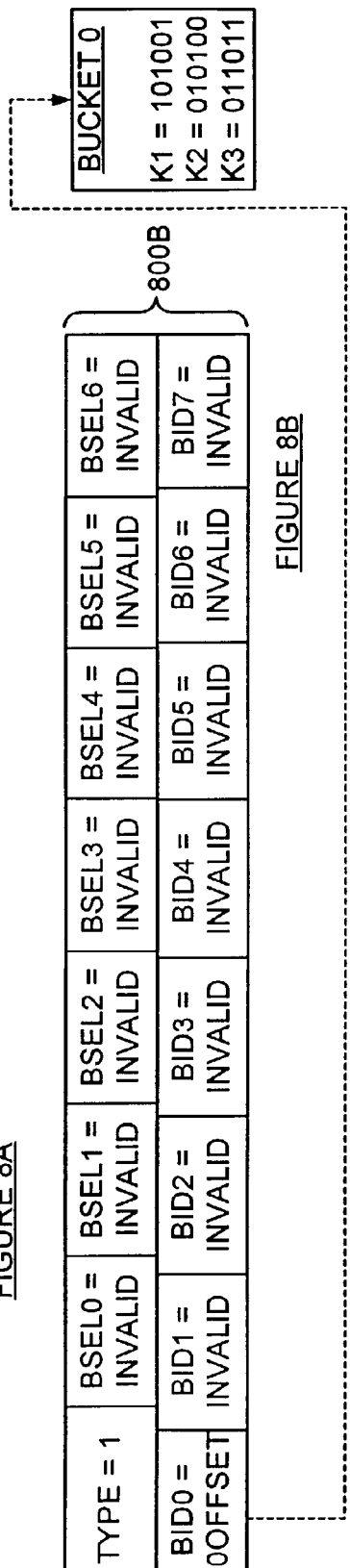

FAST, DETERMINISTIC EXACT MATCH LOOK-UPS IN LARGE TABLES

TECHNICAL FIELD

The invention provides a method of performing fast, deterministic, memory-efficient, exact match look-up operations on large tables such as TCP/IP flow tables containing millions of 104-bit {SIP, DIP, SP, DP, protocol} 5-tuple keys.

BACKGROUND

High speed networked packet switching communications systems commonly use table look-up operations to match a field or a set of fields against a table of entries. For example, Internet protocol (IP) routing operations commonly apply longest prefix match (LPM) comparison techniques to perform forwarding table look-ups. Access control list (ACL) filtering operations commonly apply masked match comparison techniques involving one or more fields to perform ACL table look-ups. Network address translation (NAT) operations also apply masked match comparison techniques involving one or more fields to perform NAT table look-ups. So-called "exact match" table look-ups, in which a multiple-field input key is matched against a table of keys to determine whether the table contains a key which exactly matches the input key, are commonly used in performing asynchronous transfer mode virtual packet identifier and virtual circuit identifier (ATM VPI/VCI) table look-ups, multi-protocol label switching (MPLS) label look-ups, transmission control protocol/Internet protocol (TCP/IP) flow identification look-ups, etc.

As one example, TCP/IP flow identification involves a flow table look-up in which a 5-tuple key, consisting of a packet's source IP address (SIP), destination IP address (DIP), source port (SP), destination port (DP) and protocol fields is used to identify packet "flow." For example, the 5-tuple {192.1.4.5, 200.10.2.3, 21, 1030, tcp} corresponds to SIP 192.1.4.5, DIP 200.10.2.3, SP 21, DP 1030 and protocol tcp. An input 5-tuple key is compared with 5-tuple keys stored in a flow table to determine whether one of the keys stored in the table exactly matches the input key. Each key in the table is stored with other information which can be retrieved and utilized to obtain packet flow information, if a stored key corresponding to the input key is located.

Flow tables can be very large. For example, a flow table suitable for use at an OC-48 line rate (2.4 Gbps) typically contains millions of entries. To accommodate such line rates the exact match table look-up operation must be extremely fast and it should be deterministic in the sense that the look-up operation should have a very high probability of successfully locating an input key in a very large table within a short finite interval on the order of a few nanoseconds.

A variety of hardware and software approaches have been used to perform exact match look-up operations on large tables, with varying degrees of efficacy. One hardware solution utilizes content addressable memory (CAM) or ternary content addressable memory (TCAM). CAM/TCAM devices facilitate extremely fast, parallel (i.e., simultaneous) look-up operations on all keys stored in a table. However, table size is limited, due to the relatively high power consumption of CAM/TCAM devices and due to the cost and complexity of apparatus incorporating the large number of CAM/TCAM devices required to contain even modestly large table. Consequently, currently available CAM/TCAM devices are not well suited to exact match look-up operations on very large tables. Hardware based trie/tree walking techniques are also impractical, since their performance is reduced by the requisite large number of memory accesses and by relatively long table update times. Single and multilevel hashing techniques are also commonly used to perform exact match look-up operations on large tables, but such techniques are constrained by the fact that the look-up operation is non-deterministic (due to the fact that hashing techniques normally use a linear walk to differentiate between collided entries), by inefficient use of memory and by relatively low performance.

SUMMARY OF INVENTION

The invention combines hash and trie techniques to facilitate fast, deterministic, memory-efficient exact match look-up operations on extremely large tables. For example, exact match look-ups can be cost-effectively performed on extremely large TCP/IP flow identification look-up tables at OC-192 line rates (10 Gbps). A limited number of hash keys which collide on the same location can be stored in the hash table. If further keys collide on the same location, a bucket trie is formed, the colliding keys are stored in the trie, and trie traversal information is stored in the hash table. Regardless of the number of buckets in the trie, an input key need only be compared with the keys in one bucket to detect a stored key identical to the input key or conclude that no stored key is identical to the input key. Look-up time is bounded by two memory burst accesses of fixed size.

Although the invention is of general application, a number of practical requirements are specifically satisfied, including exact match TCP/IP flow table look-ups utilizing {SIP, DIP, SP, DP, protocol} 5-tuple keys. Arbitrarily large bit-size keys are accommodated, in that the invention is readily adaptable to key sizes ranging from a few bits to hundreds of bits. Extremely large look-up tables having millions of entries necessitating storage in high-density off-chip auxiliary memory devices are accommodated. Look-up times are bounded and sufficiently deterministic to accommodate exact match look-up operations at OC-192 line rates using commercially available auxiliary memory devices. Dynamic table updates (key insertion and deletion) are relatively simple. The required hardware logic is relatively simple to implement, and is relatively small thus minimizing power requirements and integrated circuit surface area. Although particularly well suited to exact match look-up operations on extremely large tables, the invention can also be advantageously applied to perform exact match look-up operations on smaller tables.

BRIEF DESCRIPTION OF DRAWINGS

FIG. 2 is a simplified flow chart depicting the sequence of operations performed during exact match look-up in accordance with the invention.

FIG. 5 schematically depicts one possible bit map structure for a "type 0" hash table cell in accordance with the invention.

FIG. 6 schematically depicts one possible bit map for a "type 1" hash table cell in accordance with the invention.

FIG. 7 schematically depicts one possible bit structure for an overflow bucket table bucket in accordance with the invention.

FIG. 8A schematically depicts a type 0 hash table cell containing two 6-bit keys. FIG. 8B depicts conversion of the FIG. 8A type 0 cell into a type 1 cell associated with a bucket containing the two FIG. 8A keys and a third key. FIG. 8C depicts addition of a fourth key which fills the bucket.

DESCRIPTION

Figure 1:
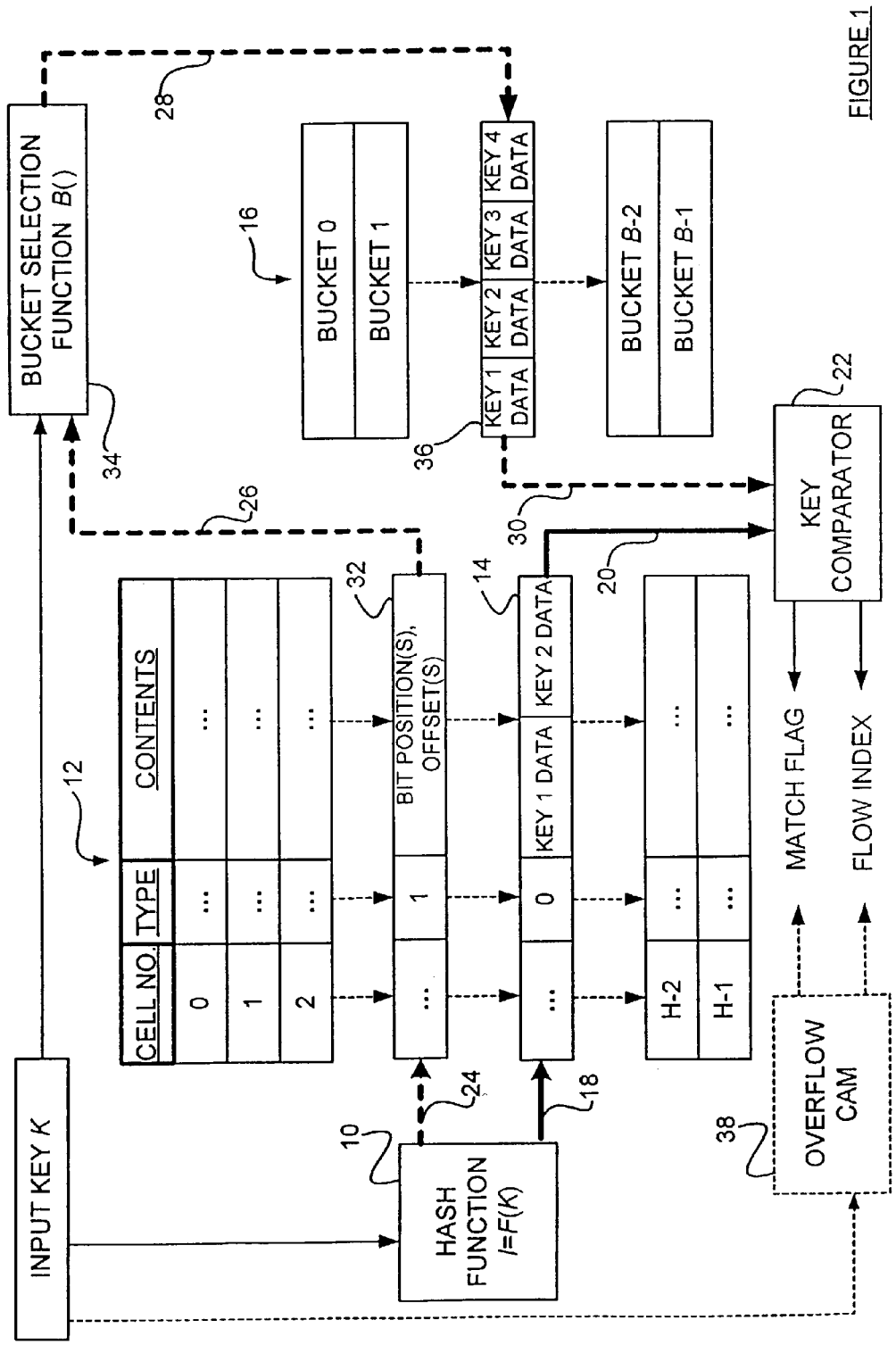
FIG. 1 is a block diagram schematically depicting exact match table look-up in accordance with the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Introduction

The object is to determine whether an input key is present in (i.e. exactly matches a key in) a table storing an extremely large number, potentially millions, of keys. Keys are initially stored in a hash table having H cells. Each cell stores up to k keys. A hash function is applied to the input key, producing a hash index corresponding to a cell in the table. If that cell contains no more than k keys a primary look-up procedure compares the keys in that cell with the input key to determine whether one of the keys in that cell exactly matches the input key.

"Hash collisions" render hashing non-deterministic. For purposes of this invention, a hash collision occurs if more than k different input keys produce the same hash index. In such case, the cell's maximum storage capacity of k keys is insufficient to store all different "colliding" keys for which the hash function produces the same hash index. If a hash collision occurs, a deterministic trie mechanism is used to redistribute the colliding keys into "buckets." Each bucket stores a maximum of m keys. A secondary look-up procedure identifies the bucket corresponding to the input key, and compares the keys stored in that bucket with the input key to determine whether one of the keys in that bucket exactly matches the input key. The hash function, the trie mechanism and their associated parameters can be selected to improve the efficiency of the secondary look-up procedure.

The invention is described in terms of these parameters:

| | |
|---|---|
| K | input key |
| T | maximum number of keys to be stored (this is application specific; total memory-key storage-capacity M can be much greater than T) |
| H | total number of cells in the hash table |
| $w_H$ | bit width of one hash table cell |
| k | maximum number of keys storable in one hash table cell |
| $B_{max}$ | maximum number of buckets in the overflow bucket table |
| $w_B$ | bit width of one bucket |
| m | maximum number of keys storable in one bucket |
| n | maximum number of buckets associated with one hash table cell |
| BSELx | key bit position containing bit value to be used in determining direction for branching from trie node x |
| BIDy | bucket index: $(BIDy*w_B)$ + overflow bucket table's initial memory address = bucket y's initial memory address |
| $F(\cdot)$ | hash function |
| $I_i$ | hash index produced by applying $F(\cdot)$ to key $K_i$ |
| I1, I2, ... | flow indices stored with keys in hash table |
| BI1, BI2, ... | flow indices stored with keys in overflow bucket table |
| $B(\cdot)$ | bucket selection function |
| M | total memory requirement = $((H*k) + (B_{max}*m))$ |
| E | Memory usage efficiency = $(T/M)$ |

Look-Up Procedure

As shown in FIGS. 1 and 2, a hash function 10, denoted $F(\cdot)$, is applied to an input key K (FIG. 2, block 200) to produce a hash index $I=F(K)$ (block 202). $F(\cdot)$ is selected so that, for any K, F(K) produces one of H possible hash indices. This allows each hash index produced by $F(\cdot)$ to correspond to one of a total of H cells in hash table 12. The hash table cells are numbered from 0 to H-1 as shown in FIG. 1. Each hash table cell is $w_H$ bits wide and can store a maximum of k keys. FIG. 1 illustrates the case in which k=2 (e.g., cell 14 contains up to 2 keys).

Each cell in hash table 12 includes a type field containing a value which indicates whether the cell is a "type 0" cell or a "type 1" cell. Type 0 cells directly store up to k keys, which are directly retrievable from such cells by a primary look-up procedure. Type 1 cells do not store keys. Instead, each type 1 cell is associated with a trie. The trie (not shown in FIG. 1, but hereafter described and illustrated) is in turn associated with one or more (up to n) key-storage buckets which are dynamically allocated to the trie from amongst a total of $B_{max}$ buckets in overflow bucket table 16, as required for storage of newly received keys. Each $w_B$ bit-wide bucket stores up to m keys. Instead of storing keys, type 1 cells store bucket indices and key bit position identifiers which are used by a secondary look-up procedure to identify the bucket in which a key exactly matching the input key may be stored. Since each type 1 cell can correspond to a maximum of n buckets, one type 1 cell can indirectly store up to n*m keys.

The primary look-up procedure is indicated by heavy, solid line arrows 18, 20 in FIG. 1. If the hash index I produced by applying $F(\cdot)$ to the input key K corresponds to a type 0 cell in hash table 12 (FIG. 2, block 204, "type 0" output) such as cell 14, then key comparator 22 compares (block 206) the input key to the key(s) stored in that type 0 cell to determine whether any of the keys stored in that cell exactly match the input key. If a stored key exactly matching the input key is not located in that type 0 cell (block 206, "no" output), then the primary look-up procedure terminates (block 208) by indicating that no key matching the input key K has been found. If a stored key exactly matching the input key is located (block 206, "yes" output), the primary look-up procedure terminates (block 210), for example by causing key comparator 22 to output a match flag and a flow index corresponding to the stored key which exactly matches the input key. Each key has a uniquely corresponding flow index. These flow indices (designated I1, I2, etc. in the case of flow indices stored in hash table 12, or designated BI1, BI2, etc. in the case of flow indices stored in overflow bucket table 16) are stored with the keys in hash table 12 and in overflow bucket table 16, and correspond only to one of the keys, not to the hash index I and not to the aforementioned bucket index.

The secondary look-up procedure is indicated by heavy dashed line arrows 24, 26, 28, 30 in FIG. 1. If the hash index I produced by applying $F(\cdot)$ to the input key K corresponds to a type 1 cell in hash table 12 (FIG. 2, block 204, "type 1" output) such as cell 32, then, as will be explained in more detail, a bucket selection function 34, denoted $B(\cdot)$, uses bits of the input key pointed to by the key bit position identifiers to determine the bucket number (1 out of n) in the trie associated with that cell and uses it to select one of the n bucket indices stored in that cell to identify a bucket 36 in bucket table 16 which may contain a key exactly matching the input key (blocks 212, 214). FIG. 1 illustrates the case in which m=4 (e.g., bucket 36 contains up to 4 keys). Key comparator 22 then compares (block 216) the input key to the key(s) stored in that bucket to determine whether any of the key(s) stored in that bucket exactly match the input key. If a stored key exactly matching the input key is not located in that bucket (block 216, "no" output), then the secondary look-up procedure terminates (block 208) by indicating that no key matching the input key K has been found. If a stored key exactly matching the input key is located in that bucket (block 216, "yes" output), the secondary look-up procedure terminates (block 210), for example by causing key comparator 22 to output match flag and index values as previously mentioned.

As explained by Knuth, "A trie is essentially an M-ary tree, whose nodes are M-place vectors with components corresponding to digits or symbols. Each node on level l represents the set of all keys that begin with a certain sequence of l symbols; the node specifies an M-way branch, depending on the (l+1)st symbol." (See: D. E. Knuth, The Art of Computer Programming, Volume 3, Sorting and Searching, Addison Wesley, 1973, page 481). Any one of a variety of well known trie structures can be used to organize the buckets corresponding to type 1 cells. Trie structures, and algorithms for trie construction, trie traversal, trie expansion and trie compression, etc. are well known to persons skilled in the art and therefore need not be described in detail. Non-exhaustive examples of suitable trie structures are provided below. The bucket selection function $B(\cdot)$ chosen for use in a particular embodiment of the invention will depend upon the trie structure selected.

A CAM 38 can be provided to handle situations in which neither hash table 12 nor overflow bucket table 16 can store any further keys. That is, situations in which the hash index I=F(K) corresponds to a type 1 cell which corresponds to a trie having the maximum of n buckets, and in which every bucket corresponding to the bit values in the new key's bit positions identified by the type 1 cell's bit position identifiers already contains its maximum of m keys. Such situations can be minimized by appropriate selection of H, k, $B_{max}$, m and n. Given appropriate minimization of such situations by techniques familiar to persons skilled in the art, a small CAM 38 can store the relatively small number of "overflow" keys which cannot be stored in hash table 12 or overflow bucket table 16.

CAM 38 is optional, as indicated by its dashed line representation in FIG. 1. If CAM 38 is provided, the input key K is compared (FIG. 2, block 218) to the keys stored in CAM 38 simultaneously with the application of $F(\cdot)$ to K to produce hash index I (block 202). If such comparison identifies a key stored in CAM 38 which exactly matches the input key K (block 218, "yes" output) then the look-up procedure terminates (block 210), and match flag and index values are output as previously explained. Each key's uniquely corresponding index value is stored with the key in CAM 38.

The look-up procedure is deterministic, due to the bounded nature of the worst-case look-up time which results when a type 1 cell is encountered. In this worst-case, the number of bits which must be fetched from hash table 12 and overflow bucket table 16 is fixed, as is the required number of compare operations. The bit width of each cell in hash table 12, and the bit width of each bucket in overflow bucket table 16 are preferably selected so that the full bit width of a single cell or bucket can be fetched at wire-speed in one or more burst accesses to memory. Comparison operations can also be performed in parallel to further expedite the look-up procedure.

The invention is primarily concerned with the look-up operation of determining whether a key exactly matching an input key is stored in hash table 12 or in overflow bucket table 16. However, to further assist persons skilled in the art in understanding the invention, a brief explanation of one manner in which keys can be inserted into or deleted from hash table 12 or overflow bucket table 16 is now provided. These explanations assume specific data structures for hash table 12 or in overflow bucket table 16 and are not intended to encompass all possible embodiments of the invention.

Key Insertion

Figure 3A:
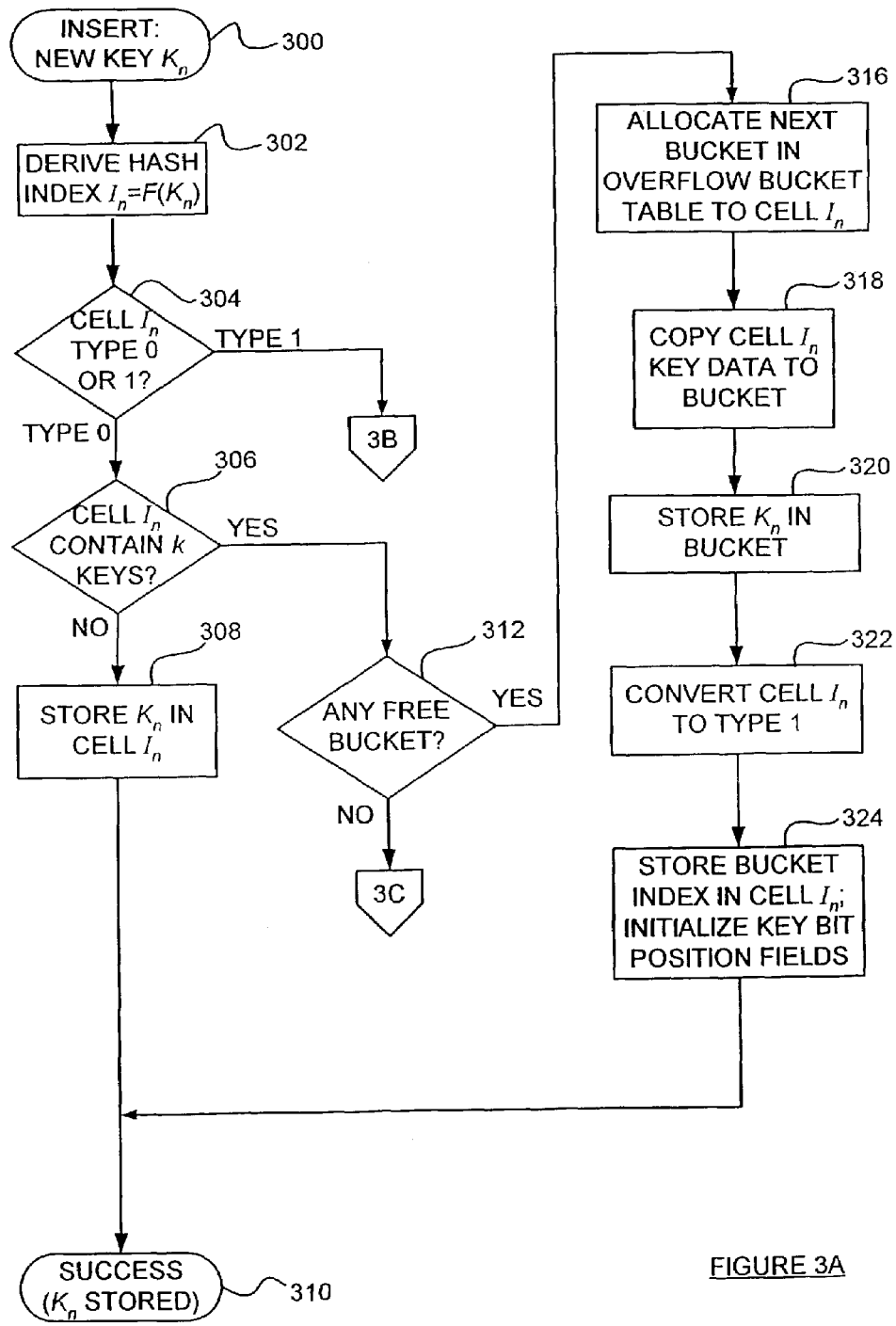
FIGS. 3A, 3B and 3C together provide a simplified flow chart depiction of the sequence of operations performed in storing keys.

Initially (i.e., before any keys are stored in hash table 12 or in overflow bucket table 16) all cells in hash table 12 are type 0 cells. A new key $K_n$ is inserted by applying $F(\cdot)$ to the new key, producing a hash index $I_n$ corresponding to one of the cells (cell $I_n$) in hash table 12 (FIG. 3A, blocks 300, 302). If cell $I_n$ is a type 0 cell (block 304, "type 0" output) which does not already contain its maximum of k keys (block 306, "no" output), then $K_n$ is stored in cell $I_n$ (block 308), which remains a type 0 cell, and the key insertion process concludes successfully (block 310).

If cell $I_n$ is a type 0 cell (block 304, "type 0" output) which already contains its maximum of k keys (block 306, "yes" output), $K_n$ cannot be stored in cell $I_n$. Instead, overflow bucket table 16 is checked (block 312) to determine whether it contains a bucket which is not already associated with other (type 1) cells in hash table 12. If overflow bucket table 16 contains no such bucket (block 312, "no" output) then $K_n$ cannot be stored and the key insertion process concludes unsuccessfully unless CAM 38 is provided as explained below with reference to FIG. 3C. As mentioned above, unsuccessful situations of this sort can be minimized by appropriate selection of H, k, $B_{max}$, m and n. If overflow bucket table 16 contains such a bucket (block 312, "yes" output) then that bucket is allocated for use by cell $I_n$ (block 316). The key data corresponding to the k keys stored in cell $I_n$ is copied into that bucket (block 318) and $K_n$ is also stored in that bucket (block 320). Cell $I_n$ is then converted (block 322) from type 0 to type 1 by overwriting its type field with the value "1", by storing (block 324) in a predefined field of cell $I_n$ a bucket index corresponding to the displacement of the allocated bucket from the start of overflow bucket table 16, and by initializing predefined key bit position data fields of cell $I_n$. As explained below, this facilitates subsequent reading and writing operations involving the bucket. The key insertion process then concludes successfully (block 310).

Figure 3B:
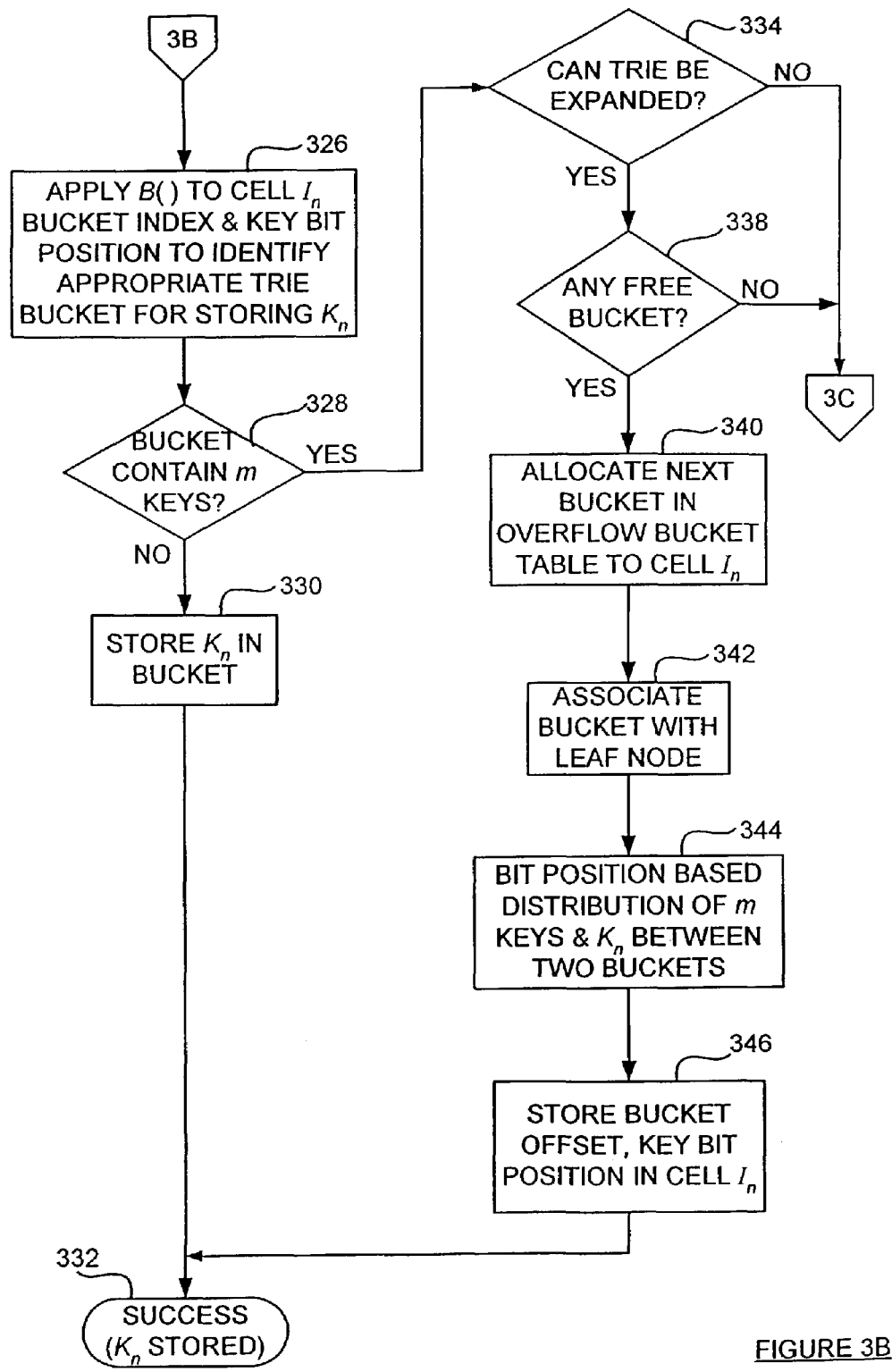

If cell $I_n$ is a type 1 cell (block 304, "type 1" output) then B(·) is applied, as hereafter explained, to the bucket index and key bit position data stored in cell $I_n$ to identify, within the trie associated with cell $I_n$, a bucket which is appropriate for storage of $K_n$ (FIG. 3B, block 326). If the identified bucket does not already contain its maximum of m keys (block 328, "no" output), then $K_n$ is stored in that bucket (block 330), and the key insertion process concludes successfully (block 332). If the identified bucket already contains its maximum of m keys (block 328, "yes" output), and if the trie associated with cell $I_n$ already has its maximum of n buckets such that the trie cannot be expanded further (block 334, "no" output) then the keys stored in those n buckets cannot be redistributed by adding another bucket to the trie in order to make room for storage of $K_n$. The key insertion process therefore concludes unsuccessfully unless CAM 38 is provided as explained below with reference to FIG. 3C.

Figure 3C:
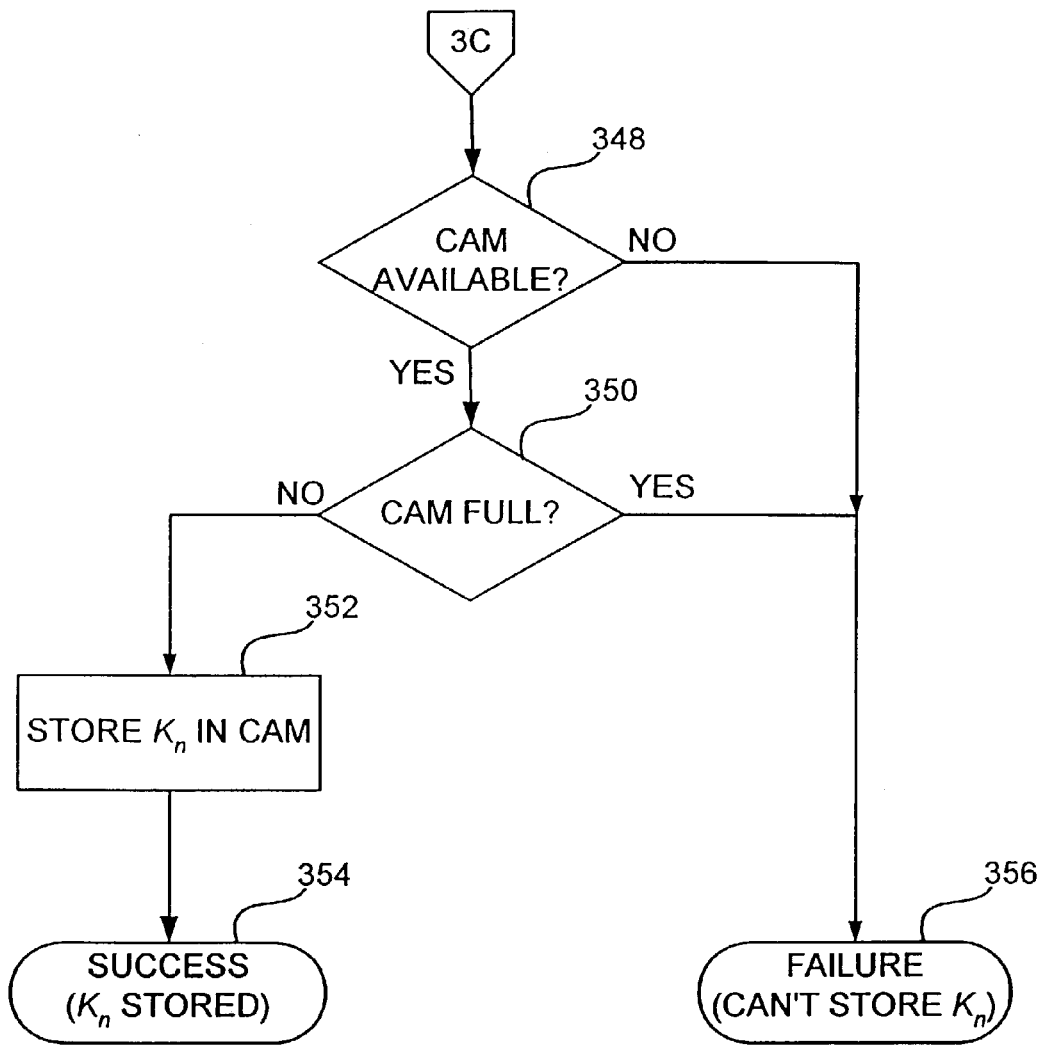

If the trie associated with cell $I_n$ does not have its maximum of n buckets (block 334, "yes" output) the key insertion process expands the trie associated with cell $I_n$ in a manner which depends on the selected trie structure. FIGS. 3A–3C assume a balanced trie structure like that described below with references to FIGS. 8A–8F and 9.

Overflow bucket table 16 is checked (block 338) to determine whether it contains a bucket which is not already associated with another type 1 cell in hash table 12. If overflow bucket table 16 contains no such bucket (block 338, "no" output) then $K_n$ cannot be stored and the key insertion process concludes unsuccessfully unless CAM 38 is provided as explained below with reference to FIG. 3C. If overflow bucket table 16 contains such a bucket (block 338, "yes" output) then that bucket is allocated for use by cell $I_n$ (block 340) and is associated with one of the trie's leaf nodes (block 342); the trie being expanded if necessary, as hereafter explained. $K_n$ and the m keys already stored in the bucket identified in block 326 are then distributed, as hereafter explained, between the bucket identified in block 326 and the bucket allocated in block 340, in accordance with a selected key bit position value which, if m is even as it usually is, preferably results in storage of m/2 of those keys in one of the two buckets and storage of the remaining (in/2)+1 keys in the other bucket (block 344). Cell $I_n$ is then updated (block 346) by storing in other predefined fields of cell $I_n$ the key bit position value selected to distribute the keys between the two buckets, and the address displacement by which the initial memory address location of the bucket allocated in block 340 is offset from overflow bucket table 16's initial memory address location. The key insertion process then concludes successfully (block 332).

Returning to block 344, persons skilled in the art will understand that there may not be a bit position value which results in the aforementioned preferred storage of m/2 keys in one of the two buckets and storage of the remaining (m/2)+1 keys in the other bucket. In such case, the best attainable key distribution may be achieved by selecting a key bit position value which results in storage of (m/2)−1 keys in one of the two buckets and storage of the remaining (m/2)+2 keys in the other bucket; or, which results in storage of (m/2)−2 keys in one of the two buckets and storage of the remaining (m/2)+3 keys in the other bucket; or, which results in some other unequal division of keys between the two buckets. The objective of the block 344 procedure is to select that key bit position value which minimizes the difference between the number of keys stored in each of the two buckets.

If the trie associated with cell $I_n$ does not have its maximum of n buckets (block 334, "yes" output), and if the full bucket identified by the block 326 operation is at the lowest level of the trie, then the trie cannot be expanded by adding a level beneath the trie node associated with the identified bucket. In such case, the trie can be reorganized by redistributing the keys using any one of a variety of techniques familiar to persons skilled in the art. One simple but potentially relatively slow approach is to rebuild the trie. Another more complex approach is to attempt to optimize the existing trie. In terms of implemenation, trie rebuilding can be algorithmically simpler than optimizing an existing trie. Trie rebuilding is also advantageous because it produces a balanced trie for the set of keys under consideration.

For example, assume that a total of N keys have collided on cell $I_n$ (i.e. N keys are currently stored in the buckets which are currently in the trie associated with cell $I_n$). A simple trie-rebuilding approach can be implemented by iteratively considering $K_n$ together with those N keys. During the first iteration the N+1 keys are examined bit-by-bit, commencing with the most significant bit, until a key bit position is located for which one group consisting of half (or approximately half) of the keys contains one binary digit value and for which a second group consisting of the remaining half (or approximately half) of the keys contains the opposite binary digit value. During subsequent iterations, if either group of keys produced by the immediately preceding iteration contains more than m keys then that group is similarly subdivided into two subgroups by locating a key bit position for which one subgroup consisting of ideally half (or approximately half) of the group's keys contains one binary digit value and for which a second subgroup consisting of the remaining half (or approximately half) of the group's keys contains the opposite binary digit value. This yields a plurality of key groups each containing less than m keys which can then be stored in buckets forming the rebuilt trie.

As indicated above, the key insertion procedure can produce a skewed trie structure with fewer than n buckets and with a full bucket identified by the block 326 operation at the lowest level of the trie. Rebuilding the trie in the foregoing manner rebalances the trie's structure. However, the trie rebuilding operation can be time consuming and is accordingly unsuited to usage during each key insertion operation in a high speed lookup implementation.

In any of the above cases in which the key insertion process concludes unsuccessfully, if optional CAM 38 has been provided (FIG. 3C, block 348, "yes" output), and if sufficient storage space remains in CAM 38 (block 350, "no" output), then $K_n$ is stored in CAM 38 (block 352), and the key insertion process concludes successfully (block 354). If CAM 38 has not been provided (block 348, "no" output); or if CAM 38 has been provided (block 348, "yes" output) but insufficient storage space remains in CAM 38 (block 350, "yes" output), then $K_n$ cannot be stored and the key insertion process concludes unsuccessfully (block 356). As mentioned above, unsuccessful situations of this sort can be minimized by appropriate selection of H, k, $B_{max}$, m and n.

Key Deletion

Figure 4A:
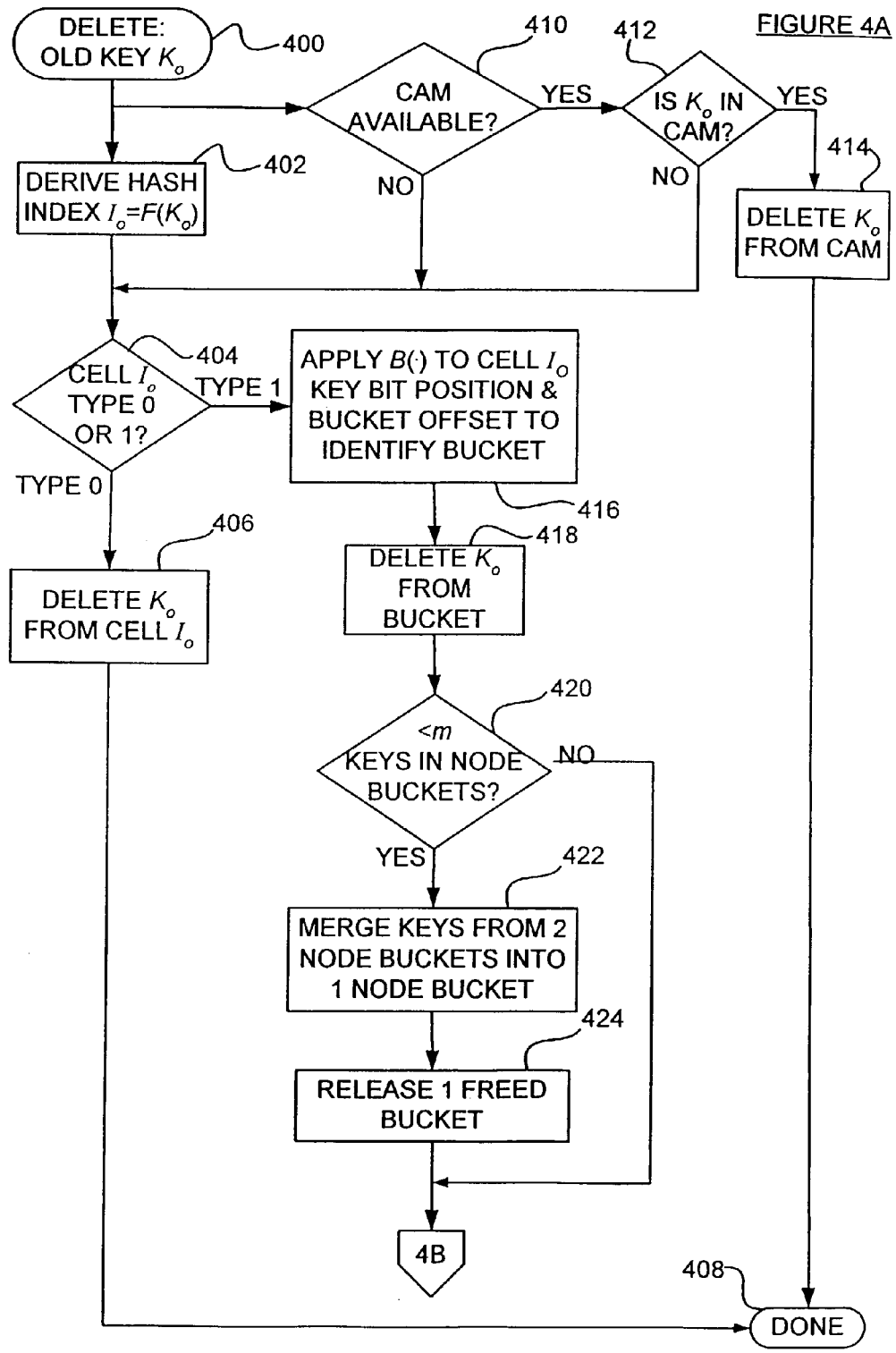
FIGS. 4A and 4B together provide a simplified flow chart depiction of the sequence of operations performed in deleting previously stored keys.

A previously stored ("old") key $K_o$ is deleted by applying F(·) to $K_o$, producing a hash index $I_o$ corresponding to one of the cells (cell $I_o$) in hash table 12 (FIG. 4A, blocks 400, 402). If cell $I_o$ is a type 0 cell (block 404, "type 0" output) then $K_o$ is deleted from cell $I_o$ (block 406), which remains a type 0 cell, and the key deletion process concludes (block 408). Simultaneously, if optional CAM 36 has been provided (block 410, "yes" output), and if $K_o$ is stored in CAM 36 (block 412, "yes" output), then $K_o$ is deleted from CAM 36 (block 414), and the key deletion process concludes (block 408). If cell $I_o$ is a type 1 cell (block 404, "no" output) then B(·) is applied, as hereafter explained, to the key bit position and bucket address offset values stored in cell $I_o$ to identify the bucket corresponding to $K_o$ (block 416). $K_o$ is then deleted from that bucket (block 418).

Figure 4B:
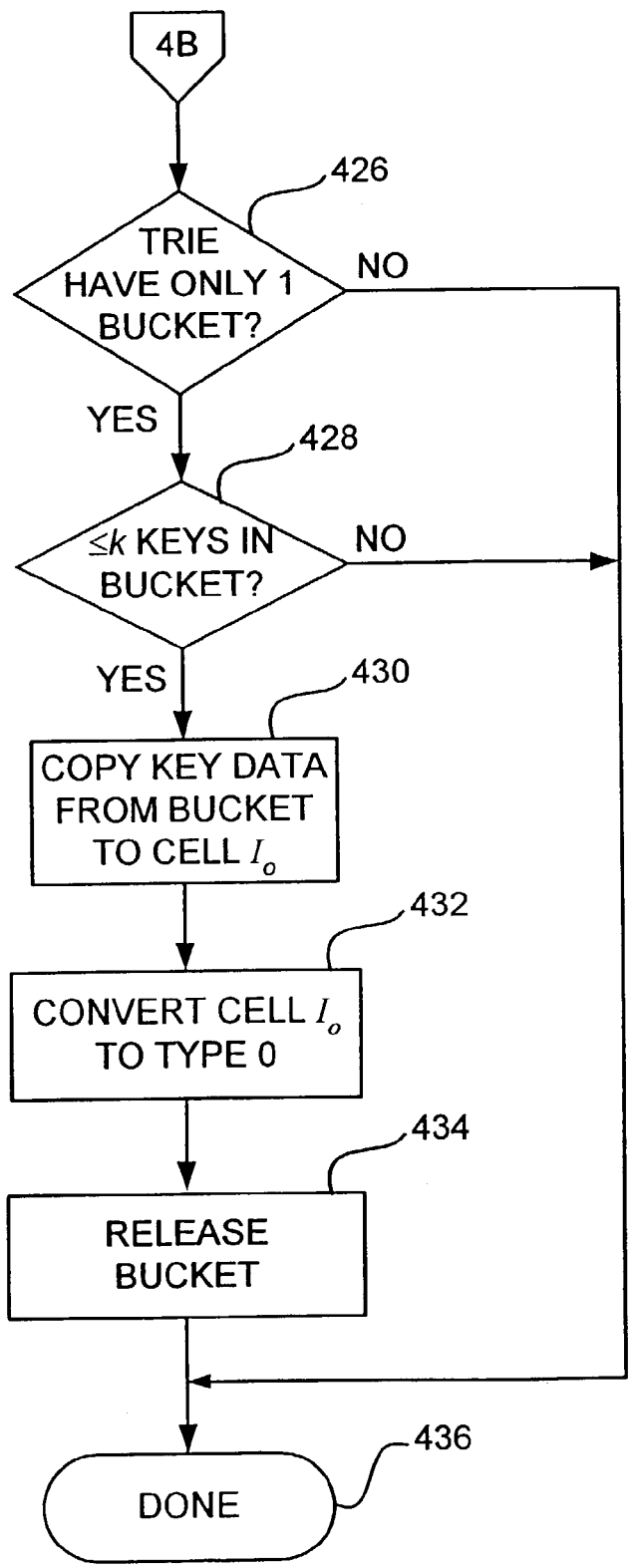

Deletion of $K_o$ may necessitate subsequent compression of the trie to maintain its structure. FIGS. 4A and 4B assume a balanced trie structure like that described below with references to FIGS. 8A–8F and 9. Trie compression can entail a variety of situations. For example, the block 418 $K_o$ deletion operation may be performed on a bucket associated with a node having a parent node which is in turn associated with another bucket. If those two "node-related" buckets collectively contain less than m keys after $K_o$ is deleted (block 420, "yes" output) then the keys in those two buckets are merged (block 422) into the bucket associated with the parent node. The bucket associated with the node beneath the parent node is then released (block 424) for future use. If the parent node has a grandparent node, the trie can be traversed upwardly in similar repetitive fashion to further compress the trie until two node-related buckets which collectively contain m or more keys are located.

If deletion of $K_o$ does not leave two node-related buckets which collectively contain less than m keys (block 420, "no" output); or, after the block 422 and 424 trie compression operations are performed; then a test (FIG. 4B, block 426) is made to determine whether the trie associated with cell $I_n$ now has only one bucket. If the test result is positive (block 426, "yes" output), and if that bucket contains k or fewer keys (block 428, "yes" output), then those k keys are copied (block 430) from that bucket into cell $I_o$, cell $I_o$ is converted to type 0 by overwriting its type field with the value "0" (block 432), the bucket is released (block 434) for future use, and the key deletion process concludes (block 436).

EXAMPLE

TCP/IP Flow Table Look-Up

The following example illustrates operation of the invention in an exact match TCP/IP flow table look-up application involving 104-bit wide {SIP, DIP, SP, DP, protocol} 5-tuple keys.

Hash table 12 is configured such that each cell has a $w_H$=256 bit storage capacity. This permits storage of two 104-bit keys per cell, hence k=2. The hash function F(·) is implemented as a so-called "H3" algorithm (see for example Ramakrishna et al, "Efficient Hardware Hashing Functions for High Performance Computers", IEEE Transactions on Computers, December 1997, Vol. 46, No. 12, pp. 1378–1381). Overflow bucket table 16 is configured such that each bucket has a $w_B$=512 bit storage capacity. This permits storage of four 104-bit keys per bucket, hence m=4. The maximum number of buckets that can be associated with one hash cell is selected to be 8, hence n=8.

The total number of cells, H, in hash table 12 is selected to be (H=T/k=T/2) where T is the maximum number of keys which the application incorporating the invention may store in hash table 12 and overflow bucket table 16 combined. The total number of buckets, $B_{max}$, in overflow bucket table 16, is selected to be (B=T/m=T/4). This requires total memory, M=2T, yielding memory efficiency, E=T/M of 50%. Other hash table configurations characterized by different values of H, k and other overflow bucket table configurations characterized by different values of $B_{max}$, m can be selected to provide a tradeoff between memory efficiency E and the probability of successful key insertion as described above with reference to FIGS. 3A–3C.

FIG. 5 depicts one possible bit map structure for a $w_H$=256 bit wide type 0 hash table cell. The leftmost two bits (bit positions 254 and 255) indicate the cell type, and contain the value "0" if the cell is a type 0 hash table cell. Since, in this example, k=2, and each 5-tuple key is 104-bits wide, the FIG. 5 type 0 cell has two 104-bit wide key fields, HK1 and HK2. Key field HK1 occupies bit positions 150 through 253 inclusive. Key field HK2 occupies bit positions 23 through 126 inclusive. Two keys, with which key comparator 22 compares the input key as described above, can be stored in key fields HK1 and HK2 (i.e., a first key stored in HK1 and a second key stored in HK2).

The FIG. 5 type 0 cell also stores two 23-bit wide flow indices, I1 and I2. As previously mentioned, these flow indices correspond only to their respectively corresponding keys, not to the hash index I and not to the aforementioned bucket index. Flow index I1, which occupies bit positions 127 through 149 inclusive, contains a value which is dynamically assigned when a key is stored in key field HK1. Flow index I2, which occupies bit positions 0 through 22 inclusive, contains a value which is dynamically assigned when a key is stored in key field HK2. 23 bits suffice to store over 8 million flow indices (i.e. T is at most $2^{23}$=8,388,608 in this example). The I1, I2 fields are initialized by storing the hexadecimal value 7FFFFF (i.e., all 23 bits set to "1") in them, this value being reserved for I1, I2 fields corresponding to key fields in which valid keys have not yet been stored. Subsequently assigned (i.e. valid) I1, I2 values are used to index into other data structures (not part of this invention and therefore not shown) containing information related to the keys stored in HK1 and HK2 respectively.

FIG. 6 depicts one possible bit map structure for a $w_H$=256 bit wide type 1 hash table cell. The leftmost two bits (bit positions 254 and 255) again indicate the cell type, and contain the value "1" if the cell is a type 1 hash table cell. Bit positions 232 through 253 inclusive are unused. The FIG. 6 type 1 cell has seven 8-bit fields BSEL0, BSEL1, BSEL2, BSEL3, BSEL4, BSEL5, and BSEL6, occupying bit positions 176 through 231 inclusive. As will be explained, in this example, each type 1 cell is associated with a trie having up to n−1=7 nodes. BSEL0 corresponds to node 0, BSEL1 corresponds to node 1, etc. Each "BSEL" field can store an 8-bit value representative of a bit position within a key. The binary digit in the key's represented bit position determines one of two directions for branching from the corresponding node. Thus, if the value "9" is stored in the BSEL3 field, then the binary value of the bit occupying the key's 9th bit position determines the branch direction at node 3. The BSEL fields are initialized by storing the hexadecimal value FF (i.e., all 8 bits set to "1") in them, this value being reserved for BSEL fields which do not yet contain valid key bit position identifiers.

The FIG. 6 type 1 cell also has one 22-bit wide "BID" field for each one of the up to n=8 buckets that can be associated with the cell in this example. Specifically, the BID0, BID1, BID2, BID3, BID4, BID5, BID6 and BID7 fields occupy bit positions 0 through 175 inclusive. Each "BID" field stores a bucket index corresponding to the displacement of the associated bucket from the start of overflow bucket table 16. This facilitates addressing of each bucket. For example, the initial memory address location of bucket 2 is obtained by adding B2OFFSET*$w_B$ (since $w_B$ is expressed in bits, this gives a bit offset, not a byte offset) to the (known) address of overflow bucket table 16's initial memory location, where B2OFFSET is the value stored in the BID2 field. The BID fields are initialized by storing the hexadecimal value 3FFFFF (i.e., all 22 bits set to "1") in them, this value being reserved for BID fields which do not yet contain valid offset values.

FIG. 7 depicts one possible bit map structure for one $w_B$=512-bit wide bucket in overflow bucket table 16. Comparison of FIGS. 5 and 7 reveals that one 512-bit bucket has a bit map structure similar to that of two consecutive type 0 hash table cells. Specifically, the leftmost two bits of one of the bucket's two consecutive 256-bit segments (bit positions 510 and 511; and, bit positions 254 and 255) are unused. Each consecutive 256-bit segment of the bucket has two 104-bit wide key fields, namely BK1, BK2 in the first segment and BK3, BK4 in the second segment. Key field BK1 occupies bit positions 406 through 509 inclusive. Key field BK2 occupies bit positions 279 through 382 inclusive. Key field BK3 occupies bit positions 150 through 253 inclusive. Key field BK4 occupies bit positions 23 through 126 inclusive. Four keys, with which key comparator 22 compares the input key as described above, can be stored in key fields BK1, BK2, BK3 and BK4 (i.e., a first key in BK1, a second key in BK2, a third key in BK3 and a fourth key in BK4).

Each 256-bit segment of the bucket also stores two 23-bit wide flow indices, namely BI1, BI2 in the first segment and BI3, BI4 in the second segment. As previously mentioned, these flow indices correspond only to their respectively corresponding keys, not to the hash index I and not to the aforementioned bucket index. Flow index BI1, which occupies bit positions 383 through 405 inclusive, contains a value which is dynamically assigned to a key inserted into key field BK1. Flow index BI2, which occupies bit positions 279 through 382 inclusive, contains a value which is dynamically assigned to a key inserted into key field BK2. Flow index BI3, which occupies bit positions 127 through 149 inclusive, contains a value which is dynamically assigned to a key inserted into key field BK3. Flow index BI4, which occupies bit positions 0 through 22 inclusive, contains a value which is dynamically assigned to a key inserted into key field BK4. The BI1, BI2, BI3, BI4 fields are initialized by storing the hexadecimal value 7FFFFF (i.e., all 23 bits set to "1") in them, this value being reserved for BI1, BI2, BI3, BI4 fields corresponding to key fields in which valid keys have not yet been stored. Subsequently assigned (i.e. valid) BI1, BI2, BI3, BI4 fields values are used to index into other data structures (unrelated to this invention and therefore not shown) containing information related to the keys stored in BK1, BK2, BK3, and BK4 respectively.

SIMPLIFIED EXAMPLE

Before continuing to explain the invention in the context of potentially unwieldy 104-bit keys, it is convenient to consider a simplified example assuming a key size of 6 bits, with hash table 12 configured to store two 6-bit keys per cell (k=2) and overflow bucket table 16 configured to store four 6-bit keys per bucket (m=4). FIG. 8A depicts a type 0 hash table cell 800A in which two keys K1, K2 having binary values K1=101001 and K2=010100 are stored with their respective indices I1, I2. Assume that a third key K3 having a binary value K3=011011 is to be stored and that a hash collision results, in that the selected hashing algorithm produces identical hash indices corresponding to cell 800A for each of K1, K2 and K3. K3 cannot be stored in cell 800A because cell 800A already contains its maximum of k=2 keys.

The next available bucket in overflow bucket table 16 is allocated for use by cell 800A as bucket "0" as shown in FIG. 8B. Keys K1, K2 are copied from cell 800A into bucket 0 (with their respective indices I1, I2), and K3 is also stored in bucket 0 (with its dynamically assigned index). Cell 800A is then converted into a type 1 cell 800B by replacing the value "0" in cell 800A's type field with the value "1" and by storing the aforementioned "invalid" initialization values (all bits set to "1") in each of cell 800B's BSEL0 through BSEL6, and BID1 through BID7 fields. Cell 800B's BID0 field is initialized by storing therein a bucket index value "B0OFFSET" representative of the address displacement by which bucket 0's initial memory address location is offset relative to overflow bucket table 16's initial memory address location. This facilitates addressing of bucket 0 and its contents in subsequent reading and writing operations.

Now assume that a fourth key K4 having a binary value K4=010101 is to be stored and that a further hash collision results, in that the selected hashing algorithm produces identical hash indices corresponding to cell 800B for each of K1, K2, K3 and K4. Since only cell 800B's BID0 field contains a non-invalid value, it is apparent that only one bucket is associated with cell 800B. The B0OFFSET value is retrieved from cell 800B's BID0 field and multiplied by $w_B$ as aforesaid. The resultant product is added to the (predefined) address of bucket table 16's initial memory address location to obtain the address of bucket 0's initial memory address location. Bucket's 0's contents are then retrieved. Since bucket 0 does not contain its maximum of m=4 keys, K4 is stored in bucket 0, as shown in FIG. 8C.

Assume now that a fifth key K5 having a binary value K5=111010 is to be stored and that a further hash collision results, in that the selected hashing algorithm produces identical hash indices corresponding to cell 800B for each of K1, K2, K3, K4 and K5. Since only cell 800B's BID0 field contains a non-invalid value, it is apparent that only one bucket is associated with cell 800B. The B0OFFSET value is again used to obtain the address of bucket 0's initial memory address location. Bucket's 0's contents are then retrieved. Since bucket 0 contains its maximum of m=4 keys, K5 cannot be stored in bucket 0.

Figure 8D:
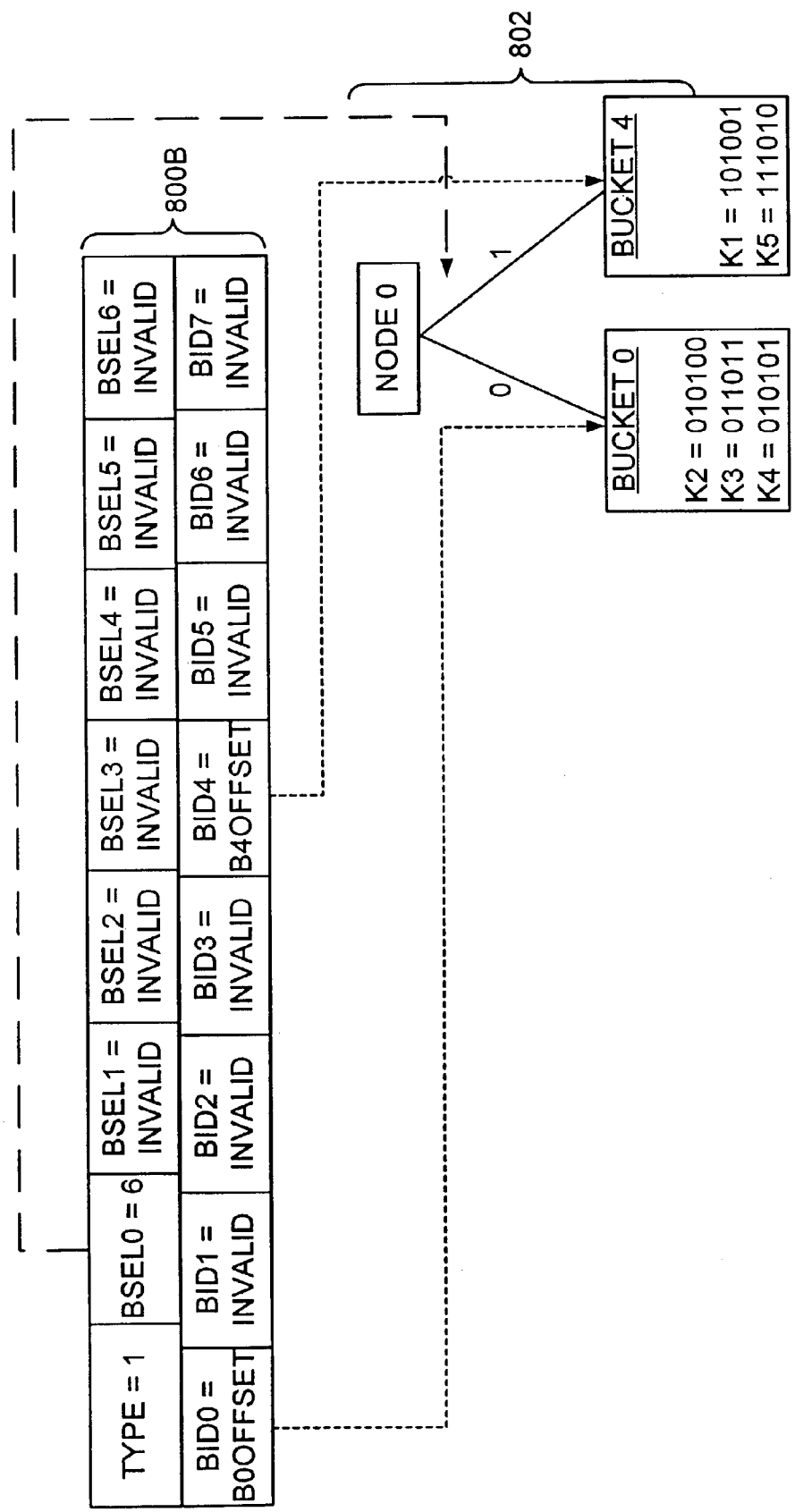
FIG. 8D depicts addition of a second bucket to accommodate a fifth key, organization of the two buckets in a trie, and bit position based redistribution of the keys between the two buckets.

The next available bucket in overflow bucket table 16 is allocated for use by cell 800B as bucket "4"; and, buckets 0 and 4 are organized in a trie 802 having a root node ("node 0") with buckets 0 and 4 each constituting one leaf of trie 802, as shown in FIG. 8D. This example assumes that trie 802 is a balanced trie having a maximum L=3 levels with $2^l$ buckets per level, where l is the trie level. The buckets are designated 0, $(2^L/2^l)$, $2*(2^L/2^l)$, $3*(2^L/2^l)$, ..., $(2^L-1)*(2^L/2^l)$. The $2^{l=1}$=2 buckets on level l=1 are thus designated $\{0, 2^L/2^1\}=\{0, 4\}$; the $2^{l=2}$=4 buckets on level l=2 are designated $\{0, (2^L/2^l), 2*(2^L/2^l), 3*(2^L/2^l)\}=\{0, 2, 4, 6\}$; and, the $2^{l=3}$=8 buckets on level l=3 are designated $\{0, (2^L/2^l), 2*(2^L/2^l), 3*(2^L/2^l), \ldots, 7*(2^L/2^l)\}=\{0, 1,2,3,4,5,6,7\}$. More generally, the number of trie levels L depends on the number of bits allocated in each type 1 cell for storage of key bit position identifiers (BSELx) and bucket indices (BIDy), and on the number of bits required per BSEL field and per BID field. The number of buckets at any trie level $1 \leq L$ is $2^l-1$. The buckets are designated, from left to right as $i*(2^L/2^l)$ for i=0, ..., $2^l-1$.

Cell 800B's BID4 field is updated by storing therein a bucket index value "B4OFFSET" representative of the address displacement by which bucket 4's initial memory address location is offset relative to overflow bucket table 16's initial memory address location. This facilitates addressing of bucket 4 and its contents in subsequent reading and writing operations.

The m=4 keys which fill bucket 0 (i.e. K1, K2, K3, K4) and K5 are redistributed between bucket 0 and bucket 4 by storing m/2 of those keys in one of buckets 0 or 4 and storing the remaining (m/2)+1 keys in the other one of those buckets. This is achieved by examining the m+1 keys bit-by-bit, commencing with the most significant bit, until a bit position is located for which m/2 keys contain one binary digit value and for which the remaining m+1−m/2 keys contain the opposite binary digit value. In this example m=4, so the object is to locate a bit position for which m/2=2 keys contain "0" and for which the remaining m+1−m/2=3 keys contain "1"; or, conversely, a bit position for which 2 keys contain "1" and for which the remaining 3 keys contain "0". As can be seen, K1 and K5 each contain "1" in their most significant bit position; and, K2, K3 and K4 each contain "0" in their most significant bit position. Accordingly, the most significant bit position (i.e. bit position 6 in this example) satisfies the foregoing objective.

Since K2, K3 and K4 each contain "0" in bit position 6 they are left in bucket 0. Since K1 and K5 each contain "1" in bit position 6 they are copied into bucket 4. K1 is then deleted from bucket 0. The value "6" is stored in cell 800B's BSEL0 field, to denote the fact that bit position 6 must be used to determine how to branch from node 0 to either of buckets 0 or 4. Specifically, if a key's bit position 6 contains the value "0" then the branch is made from node 0 to bucket 0 as indicated by the line labelled "0" in FIG. 8D, whereas if the same key's bit position 6 contains the value "1" then the branch is made from node 0 to bucket 4 as indicated by the line labelled "1" in FIG. 8D.

Consider an alternative hypothetical situation in which the most significant bit of K1, K2, K3 and K4 contains "0" and in which the most significant bit of K5 contains "1". In this situation, the keys' most significant bit position does not satisfy the foregoing objective (i.e. no 2 keys have "0" in bit position 6 with the remaining 3 keys having "1" in bit position 6; and, no 2 keys have "1" in bit position 6 with the remaining 3 keys having "0" in bit position 6). Consequently, the next most significant bit (i.e. bit position 5) of K1, K2, K3, K4 and K5 is examined to determine whether the values in bit position 5 satisfy the foregoing objective. If the values in bit position 5 satisfy the foregoing objective then those keys having the value "0" in bit position 5 remain in bucket 0; those keys having the value "1" in bit position 5 are copied into bucket 4 and deleted from bucket 0; K5 is stored in bucket 0 if it has the value "0" in bit position 5 or stored in bucket 4 if it has the value "1" in bit position 5; and, the value "5" is stored in cell 800B's BSEL0 field, to denote the fact that bit position 5 must be used to determine how to branch from node 0 to either of buckets 0 or 4.

Figure 8E:
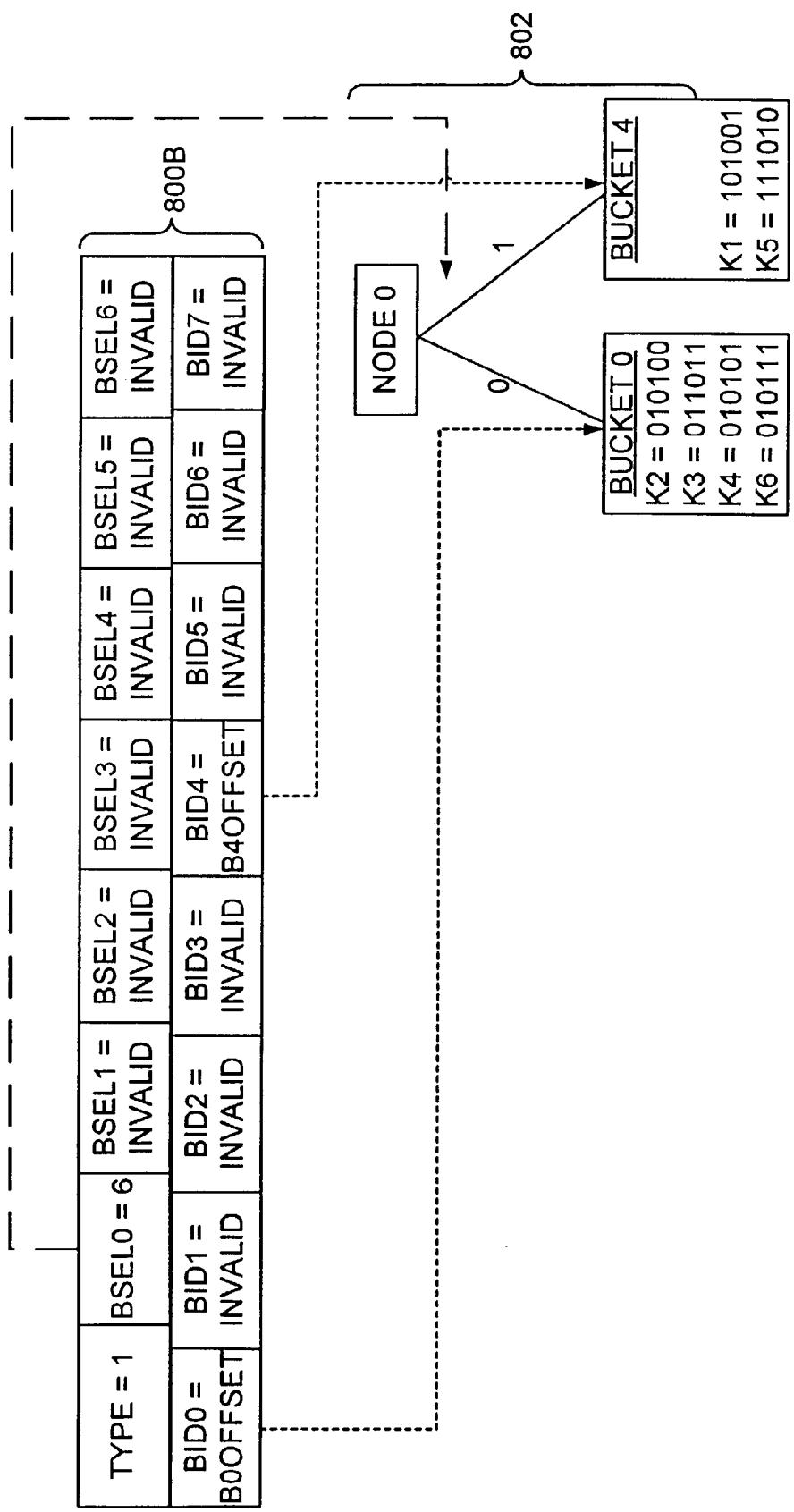
FIG. 8E depicts bit position based addition of a sixth key to one of the two buckets.

Reverting to the situation depicted in FIG. 8D, suppose that a sixth key K6 having a binary value K6=010111 is to be stored and that a further hash collision results, in that the selected hashing algorithm produces identical hash indices corresponding to cell 800B for each of K1, K2, K3, K4, K5 and K6. Since cell 800B's BID0 and BID4 fields contain non-invalid values, it is apparent that two buckets exist on trie 802's level l=1, namely bucket 0 and bucket 4. Since cell 800B's BSEL0 field contains the value 6 it is apparent that bit position 6 must be used to determine how to branch from node 0 to either of buckets 0 or 4. K6's bit position 6 contains the value "0" so, as previously explained, the branch is made from node 0 to bucket 0. The B0OFFSET bucket index value corresponding to bucket 0 is retrieved from cell 800B's BID0 field and used as previously explained to obtain the address of bucket 0's initial memory address location. Bucket's 0's contents are then retrieved. Since bucket 0 does not contain its maximum of m=4 keys, K6 is stored in bucket 0, as shown in FIG. 8E.

Now suppose that a seventh key K7 having a binary value K7=010110 is to be stored and that a further hash collision results, in that the selected hashing algorithm produces identical hash indices corresponding to cell 800B for each of K1, K2, K3, K4, K5, K6 and K7. As previously explained, the non-invalid values in cell 800B's BID0 and BID4 fields make it apparent that there are two buckets on trie 802's level l=1, namely bucket 0 and bucket 4; and, the value 6 in cell 800B's BSEL0 field makes it apparent that bit position 6 determines the branch direction from node 0 to either of buckets 0 or 4. K7's bit position 6 contains the value "0", so the branch is made from node 0 to bucket 0. The B0OFFSET bucket index value is retrieved from cell 800B's BID0 field and used to obtain the address of bucket 0's initial memory address location as previously explained. Bucket's 0's contents are then retrieved. Since bucket 0 contains its maximum of m=4 keys, K7 cannot be stored in bucket 0. Bucket 4 does not contain its maximum of m=4 keys, but K7 cannot be stored in bucket 4 because K7's bit position 6 does not contain the value "1". More particularly, the value "6" in cell 800B's BSEL0 field makes it apparent that bucket 4 can contain only keys having the value "1" in bit position 6.

Figure 8F:
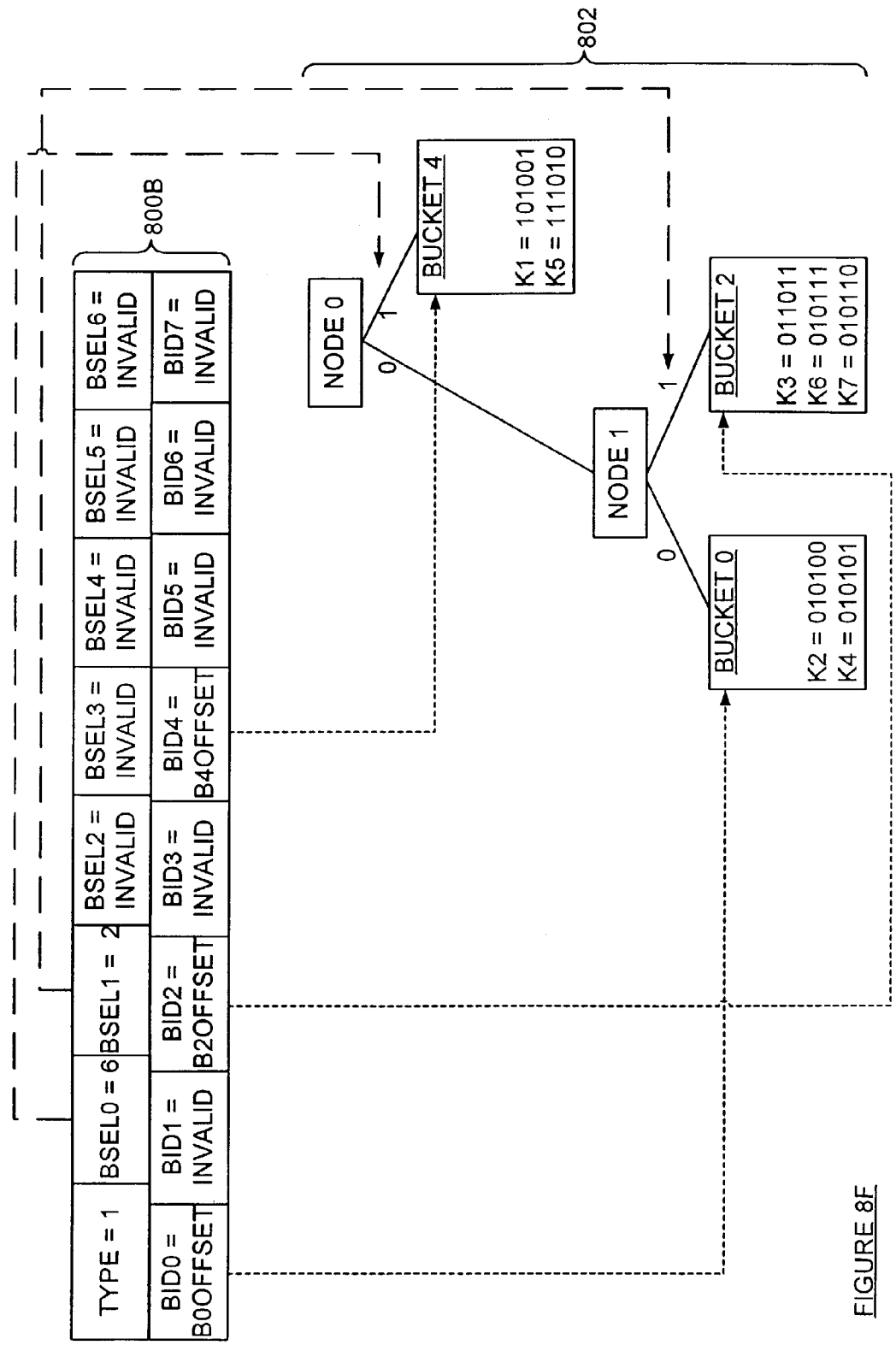
FIG. 8F depicts addition of a third bucket to accommodate a seventh key, expansion of the trie to include a second level, and bit position based redistribution of the keys between the two buckets on the second level.

Trie 802 is accordingly expanded by adding a second node ("node 1") thereto, as shown in FIG. 8F. The next available bucket in overflow bucket table 16 is allocated for use by cell 800B and designated bucket "2" as previously explained. Buckets 0 and 2 are each associated with leaf "node 1" of trie 802, as shown in FIG. 8F. Cell 800B's BID2 field is updated by storing therein a value "B2OFFSET" representative of to the address displacement by which bucket 2's initial memory address location is offset relative to overflow bucket table 16's initial memory address location. This facilitates addressing of bucket 2 and its contents in subsequent reading and writing operations. The m=4 keys which fill bucket 0 (i.e. K2, K3, K4, K6 as depicted in FIG. 8D) and the one new key K7 are redistributed between bucket 0 and bucket 2 by storing m/2 of those keys in one of buckets 0 or 2 and storing the remaining (m/2)+1 keys in the other one of those buckets. As previously explained, this is achieved by examining the m+1 keys bit-by-bit, commencing with the most significant bit, until a bit position is located for which m/2 keys contain one binary digit value and for which the remaining m+1−m/2 keys contain the opposite binary digit value. The most significant bit position which satisfies the foregoing objective for K2, K3, K4, K6 and K7 is bit position 2.

Since K2 and K4 each contain "0" in bit position 2 they are left in bucket 0. Since K3, K6 and K7 each contain "1" in bit position 2 they are copied into bucket 2. K3 and K6 are then deleted from bucket 0. The value "2" is stored in cell 800B's BSEL1 field, to denote the fact that bit position 2 must be used to determine how to branch from node 1 to either of buckets 0 or 2. Specifically, if a key's bit position 2 contains the value "0" then the branch is made from node 1 to bucket 0 as indicated by the line labelled "0" beneath node 1, whereas if the same key's bit position 2 contains the value "1" then the branch is made from node 1 to bucket 2 as indicated by the line labelled "1" beneath node 1.

Now assume that a look-up operation involving an input key $K_i$ having a binary value $K_i$=010111 is to be performed on a hash table and overflow bucket table data structure incorporating cell 800B and trie 802 as depicted in FIG. 8F. Further assume that a hash collision results, in that the selected hashing algorithm produces a hash index corresponding to cell 800B for $K_i$. The value 6 in cell 800B's BSEL0 field makes it apparent that bit position 6 determines the branch direction from node 0. $K_i$'s bit position 6 contains the value "0", so the branch is made from node 0 to node 1. The value 2 in cell 800B's BSEL1 field makes it apparent that bit position 2 determines the branch direction from node 1. $K_i$'s bit position 2 contains the value "1", so the branch is made from node 1 to bucket 2. The B2OFFSET value is retrieved from cell 800B's BID2 field and used to obtain the address of bucket 2's initial memory address location as previously explained. Bucket's 2's contents are then retrieved and compared with $K_i$, revealing that $K_i$=K6.

Note that although trie 802 depicted in FIG. 8F contains three buckets, it is only necessary to compare the input key with the keys in one bucket to detect a stored key identical to the input key (or conclude that no stored key is identical to the input key, in which case the input key can be stored as previously explained). This "one bucket key comparison" feature of the invention is maintained, regardless of the number of buckets in the trie associated with a type 1 cell and regardless of the number of trie levels.

Figure 9:
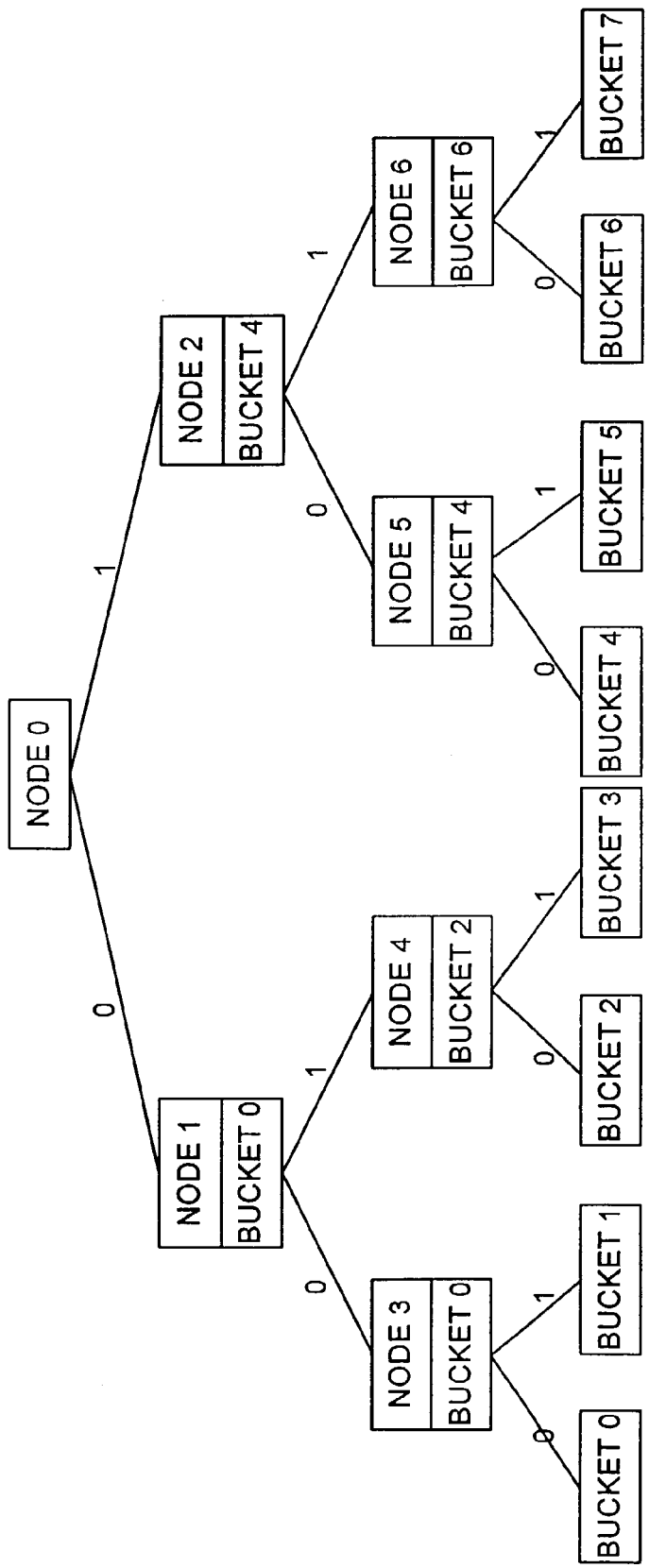
FIG. 9 schematically depicts a balanced trie formed in accordance with the invention for 8 buckets using 7 bit selectors.

FIG. 9 depicts the maximal version of trie 802 for the foregoing example; namely a balanced trie having up to L=3 levels with $2^l$ buckets per level, where l is the trie level. Although FIG. 9 depicts, for example, three separate instances of bucket 0 on each of the trie's three levels, persons skilled in the art will understand that at any given time only one instance of any particular bucket will be associated with the trie as the trie is expanded or compressed in accordance with well known trie formation algorithms to insert or delete keys.

Look-Up Procedure (Generalized)

Figure 10A:
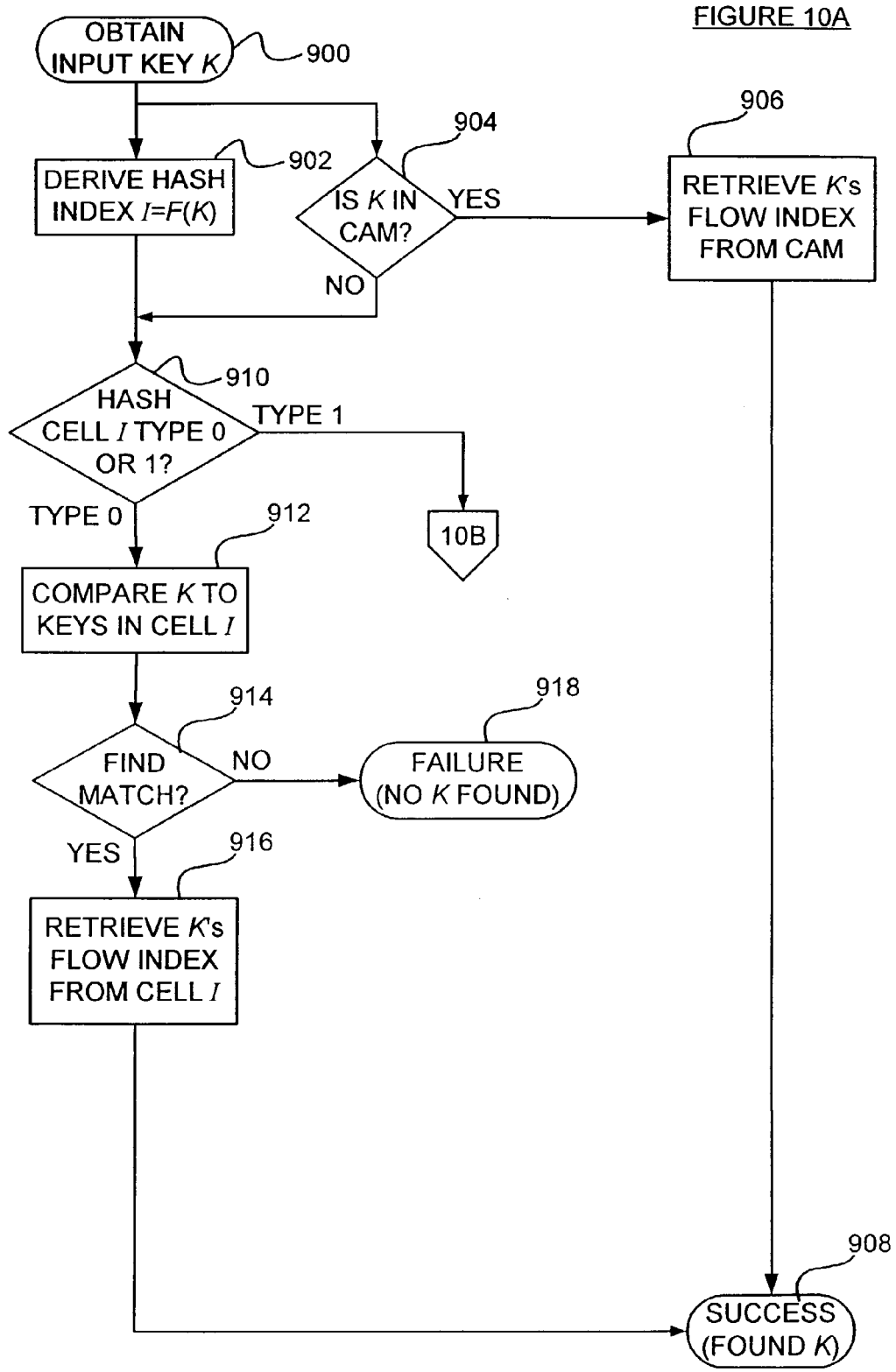
FIGS. 10A and 10B together provide further details of the sequence of operations performed during exact match look-up in accordance with the invention.
Figure 10B:
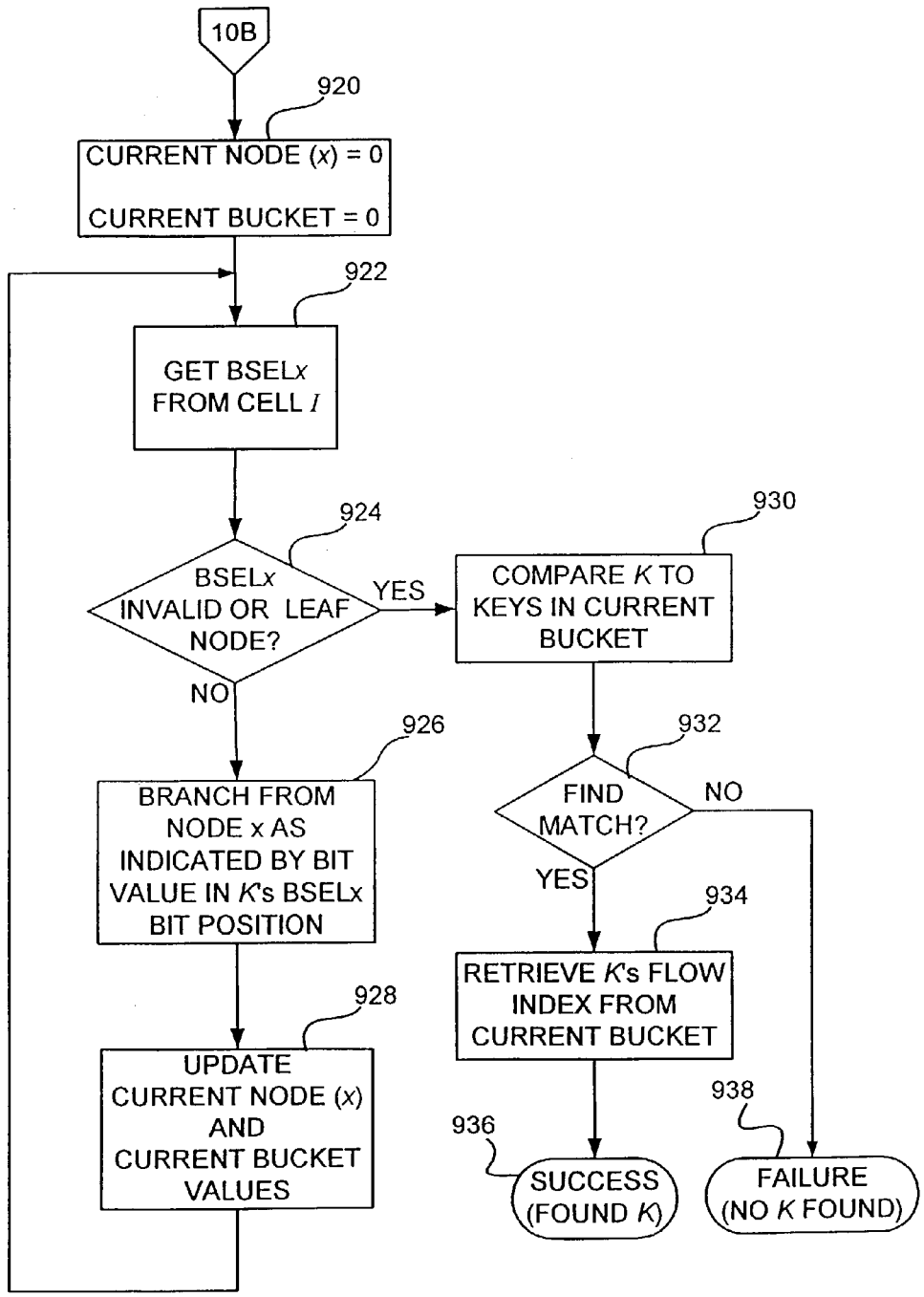

A more detailed explanation of the invention's exact match look-up operational sequence is now provided with reference to FIGS. 10A and 10B. Hash function F(·) is applied to input key K (FIG. 10A, block 900) to produce hash index I=F(K) (block 902). If CAM 38 is provided, K is compared (block 904) to the keys stored in CAM 38 simultaneously with the production of hash index I. If such comparison identifies a key stored in CAM 38 which exactly matches K (block 904, "yes" output) then the flow index stored with that matching key is retrieved from CAM 38 (block 906) and the look-up procedure concludes successfully (block 908).

If K is not stored in CAM 38 (block 904, "no" output) and if I=F(K) corresponds to a type 0 cell in hash table 12 (block 910, "type 0" output) then K is compared (block 912) to the key(s) stored in that cell. If such comparison identifies a key stored in that cell which exactly matches K (block 914, "yes" output) then the flow index stored with that matching key is retrieved from that cell (block 916) and the procedure concludes successfully (block 908). If such comparison does not identify a key stored in the type 0 cell corresponding to I=F(K) which exactly matches K (block 914, "no" output), then the procedure concludes (block 918) by indicating that no key matching the input key K is stored in hash table 12, overflow bucket table 16 or CAM 38.

If K is not stored in CAM 38 (block 904, "no" output) and if I=F(K) corresponds to a type 1 cell in hash table 12 (block 910, "type 1" output) then a "current node" counter x and a "current bucket" counter are each initialized at zero (FIG. 10B, block 920). The value in the BSELx field (i.e. BSEL0 if x=0) of the type 1 cell corresponding to I=F(K) is then retrieved (block 922).

If the retrieved BSELx value is not invalid (block 924, "no" output) then the value of the bit in K's bit position corresponding to the retrieved BSELx value is used to branch (block 926) in one of two possible directions from the current node (i.e. node 0 if the current node counter still has its initial value of x=0). The current node counter x and current bucket counter values are then updated (block 928) in a manner dependent upon the selected trie structure. The foregoing operations are then repeated, commencing with the block 922 operation, in which the BSELx field corresponding to the updated x value is retrieved.

If the retrieved BSELx value is invalid (block 924, "yes" output) or if a trie leaf node is reached (BSEL fields are not provided for leaf nodes since there can be no branching from a leaf node) then K is compared (block 930) to the key(s) stored in the current bucket (i.e. bucket 0 if the current bucket counter still has its initial value). If such comparison identifies a key stored in the current bucket which exactly matches K (block 932, "yes" output) then the flow index stored with that matching key is retrieved from the current bucket (block 934) and the procedure concludes successfully (block 936). If such comparison does not identify a key stored in the current bucket which exactly matches K (block 932, "no" output), then the procedure concludes (block 938) by indicating that no key matching the input key K is stored in hash table 12, overflow bucket table 16 or CAM 38.

The invention is much less computationally intensive than would be the case if all colliding keys were redistributed each time a collision is detected. For example, as explained above with reference to FIGS. 8E and 8F, only five keys were redistributed between buckets 0 and 2 even though seven keys collided on hash cell 800B. Redistribution of all colliding keys each time a collision is detected would optimize usage of buckets, but requires considerable memory bandwidth and is difficult to implement in hardware. Although the invention provides less optimal bucket usage, it is possible to minimize situations in which buckets are unavailable for key storage, as previously mentioned. Besides reducing computational intensity, the invention can be implemented in hardware and does not require much memory bandwidth.

Look-Up Performance 64-bit, 200 MHz double data rate, fast-cycle random access memory (DDR FCRAM) integrated circuit devices available from Toshiba America Electronic Components, Inc. Irvine, Calif. under model no. TC59LM814/06CFT can be used to store hash table 12 and overflow bucket table 16. Since these are double data rate devices, a 64-bit wide FCRAM data interface needs only one burst of four transfers consuming two memory device clock cycles to read or write a hash table cell, assuming each hash table cell is $w_H$=256-bits wide. Similarly, assuming each bucket is $w_B$=512-bits wide, two four-transfer bursts, each requiring two memory device clock cycles can be used to read or write the contents of one 512-bit bucket. However, FCRAM device timing constraints permit access to a bank of such devices only once every five memory device clock cycles, so the best per look-up timing is 5 clock cycles or 25 ns.

Worst-case look-up timing (i.e. reading both hash table 12 and overflow bucket table 16) requires 6 clock cycles, so the worst-case look-up time is 30 ns which is equivalent to a look-up rate of 33M look-ups per second. By comparison, performance of one look-up per packet at the OC-192 line rate of 10 Gbps requires a look-up rate of 25M look-ups per second, which is readily supported, with excess bandwidth remaining for dynamically updating the look-up table and performing memory refreshing. These performance estimates assume that hash table 12 and overflow bucket table 16 are stored in different banks of FCRAM devices; and, that each bucket entry is split into two separate banks, the first bank containing the entry's first 256 bits and the second bank containing the entry's remaining 256 bits. The aforementioned FCRAM integrated circuit devices each have four banks. An FCRAM integrated circuit device may have a 4, 8, 16 or 32-bit data interface. No FCRAM integrated circuit device having a 64 bit data interface is currently available. The 64-bit interface is obtained by using two FCRAM integrated circuit devices. Since FCRAM integrated circuit devices do not support 8-transfer bursts, two 4-transfer bursts are required as indicated above.

As will be apparent to those skilled in the art in the light of the foregoing disclosure, many alterations and modifications are possible in the practice of this invention without departing from the spirit or scope thereof. For example, the invention can be hardware implemented using field programmable gate array (FPGA) or application-specific integrated circuit (ASIC) technology. Instead of storing hash table 12 and overflow bucket table 16 in DDR FCRAM devices, one may store them in single data rate synchronous dynamic random access memory devices (SDRAM), reduced latency dynamic random access memory devices (RLDRAM), quadruple data rate static random access memory devices (QDR SRAM), etc. as appropriate to meet specific application requirements. Instead of using an H3 type hash function, other hash functions such as a cyclic redundancy check (CRC) type hash function can be used.

As another example, one may introduce a third type of hash cell capable of storing some (perhaps less than k) keys and also capable of storing some bucket offset and key bit position selector information sufficient to accommodate a few buckets organized in a small trie. If the trie grows beyond a certain size the third cell type will be incapable of storing sufficient bucket offset and key bit position selector information, at which point it can be converted to a type 1 cell. This alternate scheme uses buckets (and thus memory) more efficiently.

The dynamic table update procedure (i.e. key insertion and deletion) can be implemented in either software or hardware. The update procedure can be optimized as required to satisfy various speed and memory utilization trade-offs.

Figure 11:
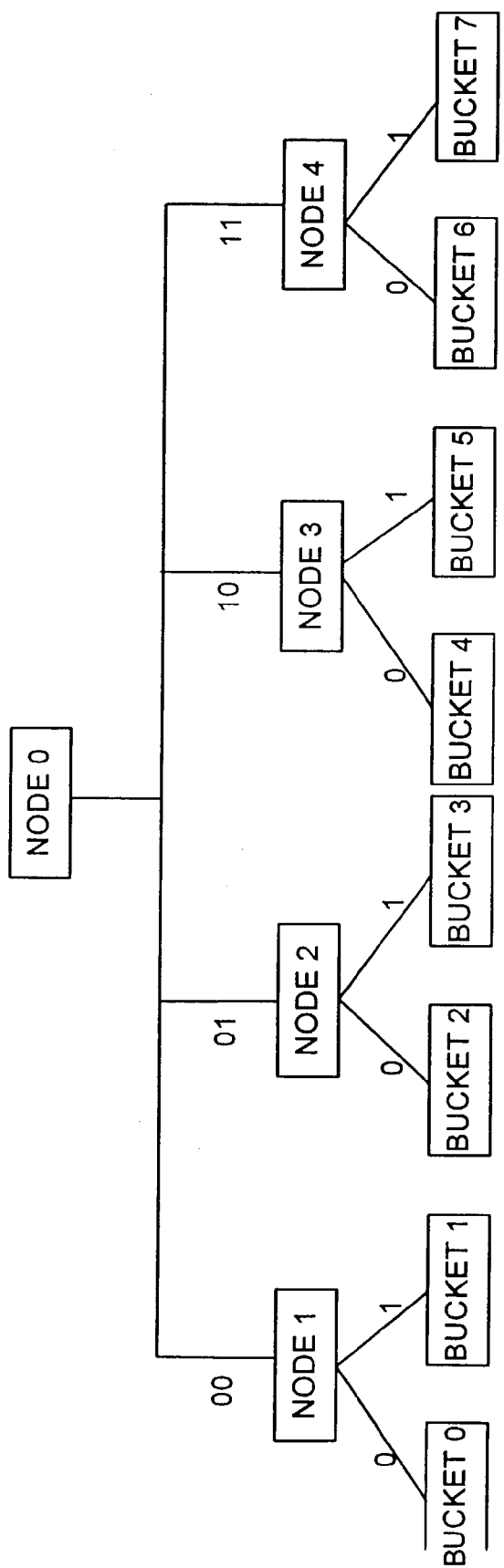
FIG. 11 schematically depicts an 8-bucket, 5-node balanced trie formed in accordance with the invention.
Figure 12:
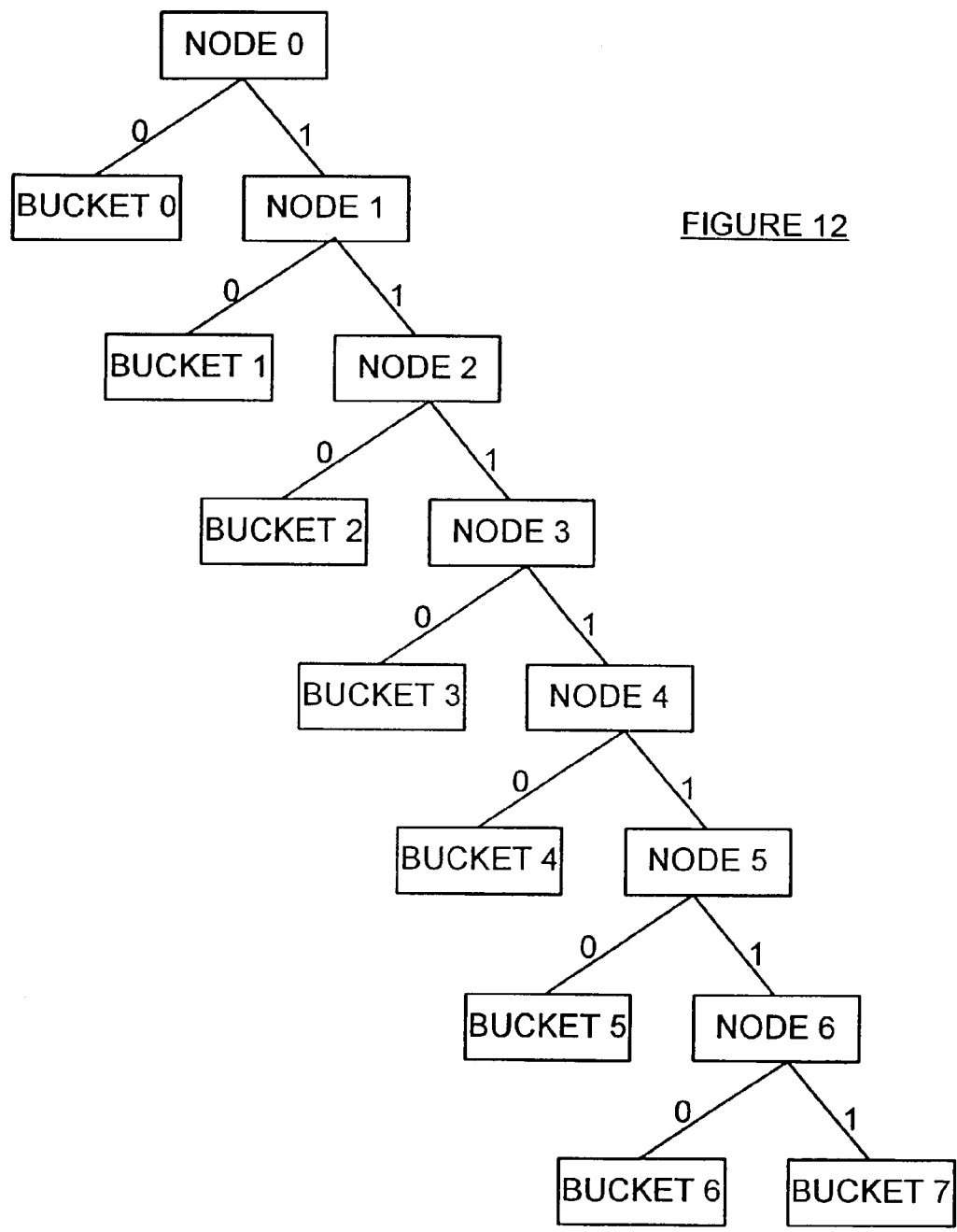
FIG. 12 schematically depicts an 8-bucket, 7-node skewed trie formed in accordance with the invention.

Type 1 hash cells can use different bit structures to accommodate different B(·) bucket selection functions using different trie structures such as skewed or multi-bit trie structures, and to accommodate additional buckets. For example, FIG. 11 depicts a balanced trie having 5 nodes and 8 buckets. In this case two bits are required to select a branch direction from root node 0 in order to reach one of the four second level nodes, whereas only one bit is required to select a branch direction from one of the second level nodes in order to reach one of the buckets. To accommodate the FIG. 11 trie structure, two BSEL fields in a type 1 hash cell are associated with node 0 (i.e. one BSEL field for each one of two key bit positions) and one BSEL field is associated with each of the remaining nodes. FIG. 12 depicts a skewed binary trie structure having 7 nodes and 8 buckets (as does the FIG. 9 balanced trie structure). A binary selector bucket selection function based on an n-bit number can be used to directly select one of $2^n$ buckets in a binary trie of this sort.

What is claimed is:
1. A look-up method comprising:
providing a data structure comprising:
(a) a hash table containing up to H cells, each one of said cells having a cell type indicator containing one of a first cell type value and a second cell type value; and
(b) an overflow bucket table containing up to $B_{max}$ buckets;
wherein:
(i) any one of said cells containing said first cell type value in said cell type indicator further comprises:
(1) k key storage fields, each one of said k key storage fields for storing one of said keys;
(2) k flow index fields, each one of said k flow index fields for storing flow index information for a key stored in a corresponding one of said k key storage fields;
(ii) any one of said cells containing said second cell type value in said cell type indicator further comprises:
(1) n-1 key bit position fields, each one of said key bit position fields for storing a bit position value representative of a bit position in any one of said keys;
(2) n bucket index fields, each one of said bucket index fields for storing an index value representative of an address displacement of a corresponding one of said buckets within said overflow bucket table;
(iii) any one of said buckets further comprises:
(1) m key storage fields, each one of said m key storage fields for storing one of said keys;
(2) m flow index fields, each one of said m flow index fields for storing flow index information for a key stored in a corresponding one of said m key storage fields;
(iv) any particular one of said cells having said second cell type value in said type field corresponds to up to n of said buckets organized in a trie having up to n-1 intermediate nodes and up to n leaf nodes, each one of said intermediate nodes corresponding to one of said key bit position fields of said particular one of said cells, said bit position value stored in said corresponding one of said key bit position fields for selecting a binary digit at a corresponding bit position in any one of said keys, said binary digit for determining a branch direction at said intermediate node corresponding to said one of said key bit position fields;
(v) each one of said up to n of said buckets organized in said trie corresponds to one of said leaf nodes; and,
(vi) H, k, $B_{max}$, n and m are integers, and
determining whether said data structure contains a key which exactly matches an input key K.
2. A look-up method as defined in claim 1, further comprising:
(a) applying a hash function F(·) to said input key K to produce a hash index I=F(K) corresponding to one of said hash table cells;
(b) if said cell type indicator of said one of said hash table cells contains said first cell type value, comparing said input key K with each key stored in said one of said hash table cells to determine whether any one of said keys stored in said one of said hash table cells exactly matches said input key K;

(c) if none of said keys stored in said one of said hash table cells exactly matches said input key K, terminating said look-up method by indicating that said data structure does not contain a key which exactly matches said input key K;

(d) if one of said keys stored in said one of said hash table cells exactly matches said input key K, terminating said look-up method by indicating which one of said keys stored in said one of said hash table cells exactly matches said input key K;

(e) if said cell type indicator of said one of said hash table cells contains said second cell type value, traversing said trie intermediate nodes, commencing at a root node of said trie, by branching in said branch directions determined by said bit position values stored in said key bit position fields corresponding to said respective intermediate nodes until one of said leaf nodes corresponding to one of said buckets is reached;

(f) comparing said input key K with each key stored in said one of said buckets to determine whether any one of said keys stored in said one of said buckets exactly matches said input key K;

(g) if none of said keys stored in said one of said buckets exactly matches said input key K, terminating said look-up method by indicating that said data structure does not contain a key which exactly matches said input key K; and, (h) if one of said keys stored in said one of said buckets exactly matches said input key K, terminating said look-up method by indicating which one of said keys stored in said one of said buckets exactly matches said input key K.

3. A look-up method as defined in claim 2, wherein said hash function $F(\cdot)$ is selected so that, for input key any K, $F(K)$ produces one of H hash indices.

4. A look-up method as defined in claim 3, wherein said hash function $F(\cdot)$ is an H3 hash function.

5. A look-up method as defined in claim 3, wherein said hash function $F(\cdot)$ is a cyclic redundancy check hash function.

6. A look-up method as defined in claim 2, further comprising:

(a) if one of said keys stored in said one of said hash table cells exactly matches said input key K, terminating said look-up method by retrieving from said one of said hash table cells containing said key exactly matching said input key K said flow index information for said stored key which exactly matches said input key K; and, (b) if one of said keys stored in said one of said buckets exactly matches said input key K, terminating said look-up method by retrieving from said one of said buckets containing said key exactly matching said input key K said flow index information for said stored key which exactly matches said input key K.

7. A look-up method as defined in claim 3, wherein said trie is a balanced trie.

8. A look-up method as defined in claim 3, further comprising storing said data structure in an auxiliary memory device not containing stored instructions for performing said look-up method.

9. A look-up method as defined in claim 8, further comprising performing said method by programmable logic operations executed by and stored in a processor electronically coupled to said auxiliary memory device.

10. A look-up method as defined in claim 9, further comprising:

(a) storing said hash table in a first group of storage locations within said auxiliary memory device;

(b) storing said overflow bucket table in a second group of storage locations within said auxiliary memory device;

(c) transferring data from said first group of storage locations to said processor during a first burst operation; and, (d) transferring data from said second group of storage locations to said processor during a second burst operation immediately following said first burst operation.

11. A look-up method as defined in claim 9, further comprising storing said hash table and said overflow bucket table within said auxiliary memory device to facilitate performance of a data read operation on said hash table during a first clock cycle, followed by performance of a data read operation on said overflow bucket table during a second clock cycle immediately following said first clock cycle.

12. A look-up method as defined in claim 2, wherein:

(a) said comparing of said input key K with each key stored in said one of said hash table cells further comprises simultaneously comparing said input key K with each key stored in said one of said hash table cells; and, (b) said comparing of said input key K with each key stored in said one of said buckets further comprises simultaneously comparing said input key K with each key stored in said one of said buckets.

13. A look-up method as defined in claim 9, wherein each data read operation performed on said auxiliary memory device retrieves a bounded amount of data from said auxiliary memory device irrespective of the number of said keys for which said hash function $F(\cdot)$ produces an identical one of said hash indices.

14. A look-up method as defined in claim 2, wherein said integer number of keys is at least 1,000,000.

15. A look-up method as defined in claim 9, wherein:

(a) said integer number of keys is at least 1,000,000; and, (b) said auxiliary memory device has a random access time no greater than 30 nanoseconds.

16. A computer-readable medium encoded with a data structure for storing an integer number of keys, said computer-readable medium comprising:

(a) a hash table containing up to H cells, each one of said cells having a cell type indicator containing one of a first cell type value and a second cell type value; and (b) an overflow bucket table containing up to $B_{max}$ buckets;

wherein:

(i) any one of said cells containing said first cell type value in said cell type indicator further comprises:

(1) k key storage fields, each one of said k key storage fields for storing one of said keys;

(2) k flow index fields, each one of said k flow index fields for storing flow index information for a key stored in a corresponding one of said k key storage fields;

(ii) any one of said cells containing said second cell type value in said cell type indicator further comprises:

(1) n-1 key bit position fields, each one of said key bit position fields for storing a bit position value representative of a bit position in any one of said keys;

(2) n bucket index fields, each one of said bucket index fields for storing an index value representative of an address displacement of a corresponding one of said buckets within said overflow bucket table;

(iii) any one of said buckets further comprises:
(1) m key storage fields, each one of said m key storage fields for storing one of said keys;
(2) m flow index fields, each one of said m flow index fields for storing flow index information for a key stored in a corresponding one of said m key storage fields;

(iv) any particular one of said cells having said second cell type value in said type field corresponds to up to n of said buckets organized in a trie having up to n-1 intermediate nodes and up to n leaf nodes, each one of said intermediate nodes corresponding to one of said key bit position fields of said particular one of said cells, said bit position value stored in said corresponding one of said key bit position fields for selecting a binary digit at a corresponding bit position in any one of said keys, said binary digit for determining a branch direction at said intermediate node corresponding to said one of said key bit position fields;

(v) each one of said up to n of said buckets organized in said trie corresponds to one of said leaf nodes; and, (vi) H, k, $B_{max}$, n and m are integers.

17. A computer-readable medium as defined in claim 16, wherein said integer number of keys is at least 1,000,000.

* * * * *